US007684597B2

(12) United States Patent
Kawano

(10) Patent No.: US 7,684,597 B2
(45) Date of Patent: Mar. 23, 2010

(54) IMAGE PROCESSING METHOD, IMAGE PROCESSING APPARATUS AND IMAGE PROCESSING PROGRAM

(75) Inventor: Tsutomu Kawano, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 1388 days.

(21) Appl. No.: 10/867,390

(22) Filed: Jun. 14, 2004

(65) Prior Publication Data

US 2005/0008206 A1  Jan. 13, 2005

(30) Foreign Application Priority Data

Jun. 19, 2003  (JP)  ............................. 2003-174956
Sep. 19, 2003  (JP)  ............................. 2003-327422
Apr. 7, 2004  (JP)  ............................. 2004-113575

(51) Int. Cl.
G06K 9/00 (2006.01)
A61B 6/00 (2006.01)

(52) U.S. Cl. ........................... 382/128; 382/168; 378/16

(58) Field of Classification Search ................. 382/100, 382/128, 129–132, 133, 134, 168, 172, 181, 382/189, 193, 201, 203, 209, 232, 255, 274, 382/271, 276, 305, 319; 378/98.8, 197, 16; 250/370.11, 368

See application file for complete search history.

(56) References Cited

U.S. PATENT DOCUMENTS

| 5,870,450 | A  | * | 2/1999  | Khutoryansky et al. ..... 378/197 |
| 6,476,394 | B1 | * | 11/2002 | Amitani et al. ............. 250/368 |
| 6,714,623 | B2 | * | 3/2004  | Sako et al. ................. 378/98.8 |
| 6,721,441 | B1 | * | 4/2004  | Granfors ..................... 382/132 |
| 6,859,513 | B2 | * | 2/2005  | Sako ........................... 378/16 |
| 6,900,442 | B2 | * | 5/2005  | Zur ....................... 250/370.11 |
| 7,155,048 | B2 | * | 12/2006 | Ohara ........................ 382/132 |

* cited by examiner

Primary Examiner—Seyed Azarian
(74) Attorney, Agent, or Firm—Lucas & Mercanti, LLP

(57) ABSTRACT

An image processing method of obtaining a image proper for diagnosis from a radiation image having signals corresponding to an irradiation dose of radiation having passed through a radiographed object, comprising: an image processing step of conducting an image processing on an image processing condition including at least one or more parameters having a preliminarily-set default value; an image processing condition adjusting step of adjusting the image processing condition; an adjustment result recording step of recording the adjustment result of the parameters in the image processing condition adjusted in the image processing condition adjusting step; a parameter changing step of renewing the default value of at least one of the parameters in the image processing condition based on adjustment results of plural time adjustments recorded in the adjustment result recording step.

37 Claims, 5 Drawing Sheets

| THE HEAD | GENERAL VIEW | | | THE HEAD AND OTHERS | | THE ABDOMEN |
|---|---|---|---|---|---|---|
| THE NECK | THE CERVICAL VERTEBRAE | | | THE THROAT/ THE PHARYNX | | |
| THE BREAST | THE BEAST | | | THE THORACIC VERTEBRAE | | |
| THE ABDOMEN | THE ABDOMEN | | | A LUMBER | | |
| THE LIMBS | THE HAND /THE LEG | SHOULDER JOINT | A HIP JOINT /THE BASIN | AN ELBOW /A KNEE | THE HAND /THE LEG | |
| THE OTHERS | CONTRAST | MAMMOGRAPHY | | | | |

SELECT THE PHOTOGRAPHING CONDITION

DETERMINATION

| THE HEAD | GENERAL VIEW | | | THE HEAD AND OTHERS | | THE ABDOMEN |
|---|---|---|---|---|---|---|
| THE NECK | THE CERVICAL VERTEBRAE | | | | | THE BREAST FRONT PART |
| THE BREAST | THE BEAST | FRONT VIEW | SIDE VIEW | CANCEL | | |
| THE ABDOMEN | THE ABDOMEN | | | | | |
| THE LIMBS | THE HAND /THE LEG | SHOULDER JOINT | A HIP JOINT /THE BASIN | AN ELBOW /A KNEE | THE HAND /THE LEG | |
| THE OTHERS | CONTRAST | MAMMOGRAPHY | | | | |

SELECT THE PHOTOGRAPHING CONDITION

DETERMINATION

IMAGE PROCESSING METHOD, IMAGE PROCESSING APPARATUS AND IMAGE PROCESSING PROGRAM

BACKGROUND OF THE INVENTION

The present invention relates to an image processing method, image processing apparatus and image processing program when a radiation image is processed, and in more detail, to an image processing method, image processing apparatus and image processing program by which, according to an adjusting amount of image processing such as an image density or contrast which is added by a user, an image processing condition which is adjusted to the user's desire can be automatically set.

Recently, an apparatus by which the radiation image can be directly photographed as a digital image, is developed. For example, as an apparatus by which a radiation amount irradiated on a subject is detected, and the radiation image formed corresponding to the detection amount is obtained as an electric signal, a method by using a detector using a stimulative fluorescent substance is numerously disclosed in such as Tokkaisho 55-12429, and Tokkaisho 63-189853.

In such an apparatus, the radiation transmitted the subject once is irradiated on a detector in which the stimulative fluorescent substance is coated on a sheet-like substrate, or which is fixedly adhered by the evaporation, and the radiation is absorbed in the stimulative fluorescent substance.

After that, when this stimulative fluorescent substance is excited by light or thermal energy, the radiation energy accumulated in this stimulative fluorescent substance by the absorption, is irradiated as the fluorescence, and this fluorescence is photo-electrically converted and the image signal is obtained.

On the one hand, the electric charges corresponding to the intensity of the irradiated radiation are generated in a photoconductive layer, the generated electric charges are accumulated in a plurality of capacitors arranged 2-dimensionally, and a radiation image detecting apparatus which is obtained by taking out those accumulated electric charges, is proposed.

In such a radiation image detecting apparatus, a detector called flat panel detector (FPD) is used. As this kind of FPD, as written in Tokkaihei 9-90048, a detector realized by a combination of the fluorescent substance which emits the fluorescence corresponding to the intensity of the irradiated radiation, and photoelectric conversion elements such as a photodiode or CCD by which the fluorescence emitted from the fluorescent substance is received directly or through a reduction optical system, and photo-electrically converted, is well known. Further, as written in Tokkaihei 6-342098, a detector by which the irradiated radiation is directly converted into electric charges, is also well known.

In these radiation image detecting apparatus, it is general that the image processing such as the gradation conversion processing or edge emphasis processing is conducted on an obtained image so that it becomes an image adequate for the diagnosis.

On the one hand, for these image processing, it is troublesome that each of them is manually conducted after obtaining the image. Particularly, in a hospital in which the number of photographing is many, when the image processing is manually set after obtaining the image in this manner, the burden of the radiation engineer is too large.

Accordingly, in these apparatus, it is structured such that, corresponding to a photographing position such as the head, chest, or abdomen, or a photographing direction, the image processing condition which is considered as optimum is previously set, and the condition is specified when the image is obtained, and the image processing is automatically conducted.

It is written in following Patent Document 1 to Patent Document 10, that the image processing is automatically conducted in this manner.

Further, in a system in which a plurality of image processing apparatuses are connected through a network, Patent Document 11 listed below discloses a system in which an operability is improved and there is no need to revise by each image processing apparatus by revising an image processing condition administrated in common with a means for administrating in common an image processing condition such that even if an optional image processing apparatus conducts image processing, the same result are obtained with the case that the other image processing apparatus conducts the same image processing for the same image.

On the other hand, an optimum image processing condition is different in each facility due to the preference of a doctor to conduct a diagnosis with use of the image obtained actually by the apparatus. Therefore, when these apparatuses are installed in each facility, it is necessary to adjust an image processing condition along a desire of a doctor.

Since it is necessary to conduct manually the adjustment for such an image processing condition for each body part to be radiographed and each radiographing orientation, a work which is complicated and takes time is required. Then, means for conducting adjustment of the image processing condition are disclosed in Patent Documents 12 and 13.

(Patent Document 1)
  Tokkai 2000-83938 (the first page, FIG. 1)

(Patent Document 2)
  Tokkai 2000-23952 (the first page, FIG. 1)

(Patent Document 3)
  Tokkaisho 63-262141 (the first page, FIG. 1)

(Patent Document 4)
  Tokkaihei 4-341246 (the first page, FIG. 1)

(Patent Document 5)
  Tokkaihei 8-62751 (the first page, FIG. 1)

(Patent Document 6)
  Tokkai 2001-29335 (the first page, FIG. 1)

(Patent Document 7)
  Tokkaihei 7-178076 (the first page, FIG. 1)

(Patent Document 8)
  Tokkaihei 8-62751 (the first page, FIG. 1)

(Patent Document 9)
  Tokkai 2002-183726 (the first page, FIG. 1)

(Patent Document 10)
  Tokkai 2002-183727 (the first page, FIG. 1)

(Patent Document 11)
  Tokkai 2002-279395 (the first page, FIG. 1)

(Patent Document 12)
  Tokkaihei 11-88678 (the first page, FIG. 1)

(Patent Document 13)
  Tokkai 2000-175035 (the first page, FIG. 1)

(The First Subject)

On the other hand, corresponding to a taste of a doctor who conducts the diagnostic by using the image obtained by these apparatus, the optimum image processing condition is different for each facility. Therefore, when these apparatus are introduced into each facility, it is necessary that the image processing condition is adjusted by meeting wishes of doctors.

Conventionally, it is necessary that the adjustment of such an image processing condition is manually conducted for each photographing position and for each photographing direction, and the operation which is troublesome and requires many times, is necessary. Therefore, an apparatus which can automatically conduct such a customized operation is required.

(Second Subject)

Further, when such a customizing work is conducted automatically, if the customizing work is always continued, an automatic parameter change is continued, there is a fear that a stable operation is not expected.

(Third Subject)

Further, in a system in which a plurality of image processing systems are connected through a network, when an image processing condition is adjusted automatically, if the adjustment is conducted independently by each apparatus, the processing result for an image of the same radiographed body part with the same radiographing attitude is varied by each image processing apparatus. This situation is not desirable, because a stable diagnosis image can not be provided. Then, it is desired to conduct adjustment of an image processing condition so as to obtain the same image processing condition in all image processing apparatuses.

Further, when plural radiography specialists use these image processing apparatuses, it may be possible for a radiography specialist having a sufficient experience to conduct image adjustment so as to provide image proper for diagnosis stably. However, in the case of a radiography specialist having an insufficient experience, it may be considered that the result of the image adjustment is not stable. In this case, it is desirable that the image processing condition is adjusted by using only the adjustment result of a specified user.

SUMMARY OF THE INVENTION

In view of the problem as described above, the present invention is attained, and the first object of the present invention is to realize an image processing method, image processing apparatus, and image processing program, by which the image processing condition for the radiation image can be automatically optimized by using the adjustment result by the user.

Further, in view of the problem as described above, the present invention is attained, and the second object of the present invention is to realize an image processing method, image processing apparatus, and image processing program, by which an image processing condition for a radiation image can be optimized automatically by utilizing an adjustment result by a user.

Still further, in view of the problem as described above, the present invention is attained, and the third object of the present invention is to realize an image processing method, image processing apparatus, and image processing program, by which adjustment of an image processing condition can be conducted simply stably by specifying a target to be reflected the result of an image adjustment even if plural image processing apparatuses and plural users use it, when an image processing condition for a radiation image is optimized automatically by utilizing an adjustment result by a user.

That is, the above-described problems can be solved by the inventions listed below.

(A) An image processing method of obtaining a image proper for diagnosis from a radiation image having signals corresponding to an irradiation dose of radiation having passed through a radiographed object, comprises:

an image processing step of conducting an image processing on an image processing condition including at least one or more parameters having a preliminarily-set default value;

an image processing condition adjusting step of adjusting the image processing condition;

an adjustment result recording step of recording the adjustment result of the parameters in the image processing condition adjusted in the image processing condition adjusting step;

a parameter changing step of renewing the default value of at least one of the parameters in the image processing condition based on adjustment results of plural time adjustments recorded in the adjustment result recording step.

(B) An image processing program to make a computer to conduct the image processing method described in (A) so as to obtain a image proper for diagnosis from a radiation image having signals corresponding to an irradiation dose of radiation having passed through a radiographed object.

(C) An image processing apparatus for obtaining a image proper for diagnosis from a radiation image having signals corresponding to an irradiation dose of radiation having passed through a radiographed object, comprises:

an image processing section of conducting an image processing on an image processing condition including at least one or more parameters having a preliminarily-set default value;

an image processing condition adjusting section of adjusting the image processing condition;

an adjustment result recording section of recording the adjustment result of the parameters in the image processing condition adjusted in the image processing condition adjusting section;

a parameter changing section of renewing the default value of at least one of the parameters in the image processing condition based on adjustment results of plural time adjustments recorded in the adjustment result recording section.

BRIEF DESCRIPTION OF THE DRAWINGS

FIGS. 2(*a*) and 2(*b*) each is a schematic diagram showing a situation of the subject information selection in an embodiment of the present invention.

DETAILED DESCRIPTION OF THE PREFERRED EMBODIMENT

Figure 1:
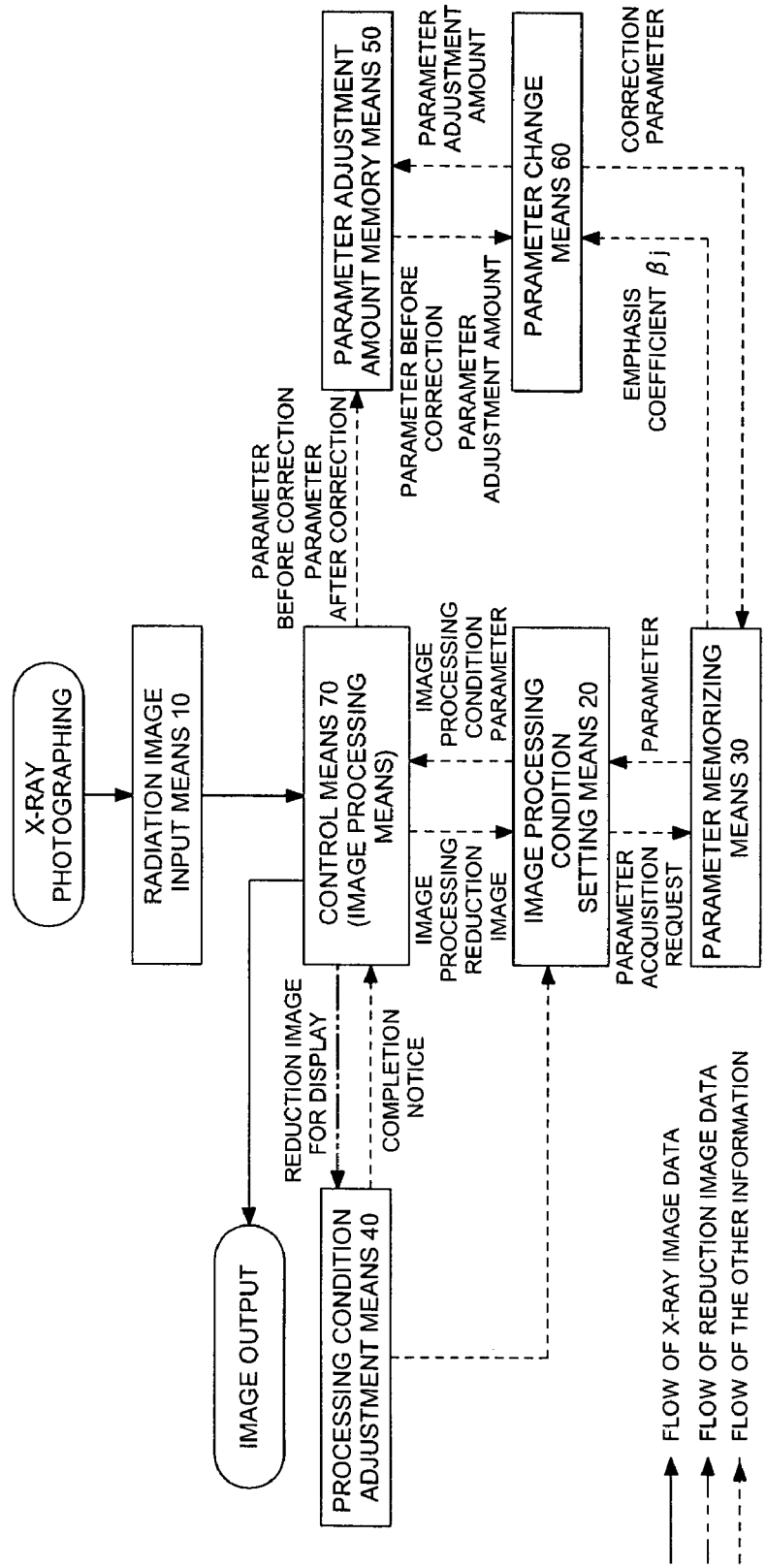
FIG. 1 is an explanatory view showing the whole structure or a flow of the whole processing in an embodiment of the present invention.

Firstly, preferable method and apparatuses according to the present invention are described.

(1) A method written in (1) is an image processing method of obtaining the image adequate for the diagnosis for the radiation image having a signal corresponding to the irradiation dose of the radiation transmitted the subject is conducted, and is characterized in that: it has an image processing step to conduct an image processing on the radiation image on a preliminarily set image processing condition including one or more parameters; an image processing condition adjusting step to further adjust the image processing condition for the processed image on which the image processing is conducted by the image processing step; a parameter adjustment amount memorizing step to store the parameter adjustment amount of the parameter included in the image processing condition adjusted in the image processing condition adjusting step; and a parameter changing step to change the parameter, stored in the parameter memorizing step, corresponding to the image processing condition according to the stored parameter adjustment amount.

An apparatus written in (1) is an image processing apparatus for obtaining the image adequate for the diagnosis for the radiation image having a signal corresponding to the irradiation dose of the radiation transmitted the subject is conducted, and is characterized in that: it has an image processing means to conduct an image processing on the radiation image on a preliminarily set image processing condition including one or more parameters; an image processing condition adjusting means to further adjust the image processing condition for the processed image on which the image processing is conducted by the image processing means; a parameter adjustment amount memorizing means to store the parameter adjustment amount of the parameter included in the image processing condition adjusted in the image processing condition adjusting means; and a parameter changing means to change the parameter, stored in the parameter memorizing means, corresponding to the image processing condition according to the stored parameter adjustment amount.

(2) A method written in (2) is an image processing method written in (1), which characterized in that: it further has an image processing condition setting step which has a plurality of image processing conditions, and by which the adequate image processing condition is supplied to the image processing step; the parameter adjustment amount memorizing step stores the parameter adjustment amount for each of a plurality of image processing conditions; and the parameter changing step changes the parameter for each image processing condition according to the parameter adjustment amount stored in the parameter adjustment amount memorizing step for each image processing condition.

Further, an apparatus written in (2) is an image processing apparatus written in (1) which is characterized in that: it further has an image processing condition setting means which has a plurality of image processing conditions and supplies the adequate image processing condition to the image processing means; the parameter adjustment amount memorizing means stores the parameter adjustment amount for each of a plurality of image processing conditions; and the parameter changing means changes the parameter for each image processing condition according to the parameter adjustment amount stored in the parameter adjustment amount memorizing means for each image processing condition.

(3) A method written in (3) is an image processing method written in any one of (1) or (2), which is characterized in that: the parameter adjustment amount memorizing step stores the parameter adjustment amount for a plurality of number of times of image processing for each image processing relating to the parameter adjustment amount for each processing condition adjusted in the processing condition adjusting step; and the parameter changing step changes the parameter excluding the parameter adjustment amount for a predetermined number of times in which the absolute value is large in the stored parameter adjustment amounts.

Further, an apparatus written in (3) is an image processing apparatus written in any one of (2) or (3), which is characterized in that: the parameter adjustment amount memorizing means stores parameter adjustment amounts for a plurality of times of image processing for each image processing relating to the parameter adjustment amount for each processing condition adjusted by the processing condition adjusting means; and the parameter changing means excludes the parameter adjustment amounts for a predetermined number of times in which the absolute value is large in the stored parameter adjustment amounts and changes the parameter.

(4) A method written in (4) is an image processing method written in any one of (1) or (2), which is characterized in that: the parameter changing step changes the parameter relating to the parameter having a continuous value so that the average value of the parameter adjustment amounts of a plurality of times which are stored in the parameter memorizing step is decreased.

Further, an apparatus written in (4) is an image processing apparatus written in any one of (1) or (2), which is characterized in that: the parameter changing means changes the parameter relating to the parameter having a continuous value so that the average value of the parameter adjustment amounts of a plurality of times which are stored in the parameter memorizing means is decreased.

(5) A method written in (5) is an image processing method written in (1), which is characterized in that: it further comprises a parameter change permission judging step to stop changing the parameter in the parameter changing step when a predetermined condition is satisfied.

A apparatus written in (5) is an image processing apparatus written in (1), which is characterized in that: it further comprises a parameter change permission judging means to stop changing the parameter in the parameter changing means when a predetermined condition is satisfied.

(6) A method written in (6) is an image processing method written in (5), which is characterized in that: the parameter change permission judging step obtains a difference between a parameter value after changing the parameter by calculating from the parameter adjustment amount stored in the parameter adjustment amount memorizing step and a parameter value at this time, and when the absolute value of the difference is not larger than the predetermined threshold value Thd1, the parameter change permission judging step stops changing the parameter.

An apparatus written in (6) is an image processing apparatus written in (5), which is characterized in that: the parameter change permission judging means obtains a difference between a parameter value after changing the parameter by calculating from the parameter adjustment amount stored in the parameter adjustment amount memorizing means and a parameter value at this time, and when the absolute value of the difference is not larger than the predetermined threshold value Thd1, the parameter change permission judging means stops changing the parameter.

(7) A method written in (7) is an image processing method written in (5) or (6), which is characterized in that: the parameter change permission judging step obtains a difference between a parameter value after changing the parameter by calculating from the parameter adjustment amount stored in the parameter adjustment amount memorizing step and a parameter value at this time, and when the absolute value of the difference is not smaller than the predetermined threshold value Thd2, the parameter change permission judging step resumes changing the parameter.

An apparatus written in (7) is an image processing apparatus written in (5) or (6), which is characterized in that: the parameter change permission judging means obtains a difference between a parameter value after changing the parameter by calculating from the parameter adjustment amount stored in the parameter adjustment amount memorizing means and a parameter value at this time, and when the absolute value of the difference is not smaller than the predetermined threshold value Thd2, the parameter change permission judging means resumes changing the parameter.

(8) A method written in (8) is an image processing method written in (7), which is characterized in that: in the parameter change permission judging step, the predetermined threshold value Thd1 to stop changing the parameter and the predetermined threshold value Thd2 to resume changing the parameter satisfy the following formula:

Thd2>Thd1

An apparatus written in (8) is an image processing apparatus written in (7), which is characterized in that: in the parameter change permission judging means, the predetermined threshold value Thd1 to stop changing the parameter the predetermined threshold value Thd2 to resume changing the parameter satisfy the following formula:

Thd2>Thd1

(9) A method written in (9) is an image processing method written in (5), which is characterized in that: the parameter change permission judging step obtains a ratio Rp of a parameter value after changing the parameter by calculating from the parameter adjustment amount stored in the parameter adjustment amount memorizing step to a parameter value at this time, and when the absolute value of the ratio Rp satisfies the condition of (1−Thd3<Rp<1+Thd3) with regard to the predetermined threshold value Thd3, the parameter change permission judging step stops changing the parameter.

An apparatus written in (9) is an image processing apparatus written in (5), which is characterized in that: the parameter change permission judging means obtains a ratio Rp of a parameter value after changing the parameter by calculating from the parameter adjustment amount stored in the parameter adjustment amount memorizing step to a parameter value at this time, and when the absolute value of the ratio Rp satisfies the condition of (1−Thd3<Rp<1+Thd3) with regard to the predetermined threshold value Thd3, the parameter change permission judging means stops changing the parameter.

(10) A method written in (10) is an image processing method written in (5) or (9), which is characterized in that: the parameter change permission judging step obtains a ratio Rp of a parameter value after changing the parameter by calculating from the parameter adjustment amount stored in the parameter adjustment amount memorizing step to a parameter value at this time, and when the absolute value of the ratio Rp satisfies the condition of (1−Thd4>Rp or 1+Thd4<Rp) with regard to the predetermined threshold value Thd4, the parameter change permission judging step resumes changing the parameter.

An apparatus written in (10) is an image processing apparatus written in (5) or (9), which is characterized in that: the parameter change permission judging means obtains a ratio Rp of a parameter value after changing the parameter by calculating from the parameter adjustment amount stored in the parameter adjustment amount memorizing step to a parameter value at this time, and when the absolute value of the ratio Rp satisfies the condition of (1−Thd4>Rp or 1+Thd4<Rp) with regard to the predetermined threshold value Thd4, the parameter change permission judging means resumes changing the parameter.

(11) A method written in (11) is an image processing method written in (10), which is characterized in that: in the parameter change permission judging step, the predetermined threshold value Thd3 to stop changing the parameter the predetermined threshold value Thd4 to resume changing the parameter satisfy the following formula:

Thd4>Thd3

An apparatus written in (11) is an image processing apparatus written in (10), which is characterized in that: in the parameter change permission judging means, the predetermined threshold value Thd3 to stop changing the parameter the predetermined threshold value Thd4 to resume changing the parameter satisfy the following formula:

Thd4>Thd3

(12) A method written in any one of (1) to (11) is an image processing method written in (10), which is characterized in that: it further comprises a parameter adjustment amount memorization permission judging step to judge whether or not the parameter adjustment amount is memorized in the parameter adjustment amount memorizing step.

An apparatus written in (11) is an image processing apparatus written in (10), which is characterized in that: it further comprises a parameter adjustment amount memorization permission judging means to judge whether or not the parameter adjustment amount is memorized in the parameter adjustment amount memorizing means.

(13) A method written in (13) is an image processing method of obtaining the image adequate for the diagnosis for the radiation image having a signal corresponding to the irradiation dose of the radiation transmitted the subject is conducted, and is characterized in that: it has an image processing step to conduct an image processing on the radiation image on a preliminarily set image processing condition including one or more parameters; an image processing condition adjusting step to further adjust the image processing condition for the processed image on which the image processing is conducted by the image processing step; an adjusted parameter memorizing step to store the value of a parameter after the parameter adjustment included in the image processing condition adjusted in the image processing condition adjusting step; and a parameter changing step to change the parameter, stored in the parameter memorizing step, corresponding to the image processing condition according to the parameter after the parameter adjustment.

Further, an apparatus written in (13) is an image processing apparatus for obtaining the image adequate for the diagnosis for the radiation image having a signal corresponding to the irradiation dose of the radiation transmitted the subject is conducted, and is characterized in that: it has an image processing means to conduct an image processing on the radiation image on a preliminarily set image processing condition including one or more parameters; an image processing condition adjusting means to further adjust the image processing condition for the processed image on which the image processing is conducted by the image processing means; an adjusted parameter memorizing means to store the value of a parameter after the parameter adjustment included in the image processing condition adjusted in the image processing condition adjusting means; and a parameter changing means to change the parameter, stored in the parameter memorizing means, corresponding to the image processing condition according to the parameter after the parameter adjustment.

(14) A method written in (14) is an image processing method written in (13), which is characterized in that: the parameter changing step determines, for the parameter having a discrete value, by the mode of the parameter values after adjustments of a plurality of times stored in the parameter memorizing step.

Further, an apparatus written in (14) is an image processing apparatus written in (13), which is characterized in that: the parameter changing means determines, for the parameter having a discrete value, by the mode of the parameter values after adjustments of a plurality of times stored in the parameter memorizing means.

(15) A method written in (15) is an image processing method written in (13), which is characterized in that: the parameter changing step, relating to a parameter having a continuous value, changes the parameter so that the difference between the average value of the parameter values after adjustments of a plurality of times stored in the parameter memorizing step and the value of the concerned parameter, is decreased.

Further, an apparatus written in (15) is an image processing apparatus written in (13), which is characterized in that: the parameter changing means, relating to a parameter having a continuous value, changes the parameter so that the difference between the average value of the parameter values after adjustments of a plurality of times stored in the parameter memorizing means and the value of the concerned parameter, is decreased.

(16) A method written in (16) is an image processing method written in (14), which is characterized in that: the parameter changing step, relating to a parameter having a continuous value, changes the parameter so that the average value of the parameter values after adjustments of a plurality of times stored in the parameter memorizing step is decreased.

Further, an apparatus written in (16) is an image processing apparatus written in (14), which is characterized in that: the parameter changing means, relating to a parameter having a continuous value, changes the parameter so that the average value of the parameter values after adjustments of a plurality of times stored in the parameter memorizing means is decreased.

(17) A method written in (17) is an image processing method written in (13), which is characterized in that: it further comprises a parameter change permission judging step to stop changing the parameter in the parameter changing step when a predetermined condition is satisfied.

A apparatus written in (17) is an image processing apparatus written in (13), which is characterized in that: it further comprises a parameter change permission judging means to stop changing the parameter in the parameter changing means when a predetermined condition is satisfied.

(18) A method written in (18) is an image processing method written in (17), which is characterized in that: the parameter change permission judging step obtains a difference between a parameter value after changing the parameter by calculating from the parameter after the adjustment stored in the changed parameter memorizing step and a parameter value at this time, and when the absolute value of the difference is not larger than the predetermined threshold value Thd1, the parameter change permission judging step stops changing the parameter.

An apparatus written in (18) is an image processing apparatus written in (17), which is characterized in that: the parameter change permission judging means obtains a difference between a parameter value after changing the parameter by calculating from the parameter after the adjustment stored in the changed parameter memorizing means and a parameter value at this time, and when the absolute value of the difference is not larger than the predetermined threshold value Thd1, the parameter change permission judging means stops changing the parameter.

(19) A method written in (19) is an image processing method written in (17) or (18), which is characterized in that: the parameter change permission judging step obtains a difference between a parameter value after changing by calculating from the parameter after the adjustment stored in the changed parameter memorizing step and a parameter value at this time, and when the absolute value of the difference is not smaller than the predetermined threshold value Thd2, the parameter change permission judging step resumes changing the parameter.

An apparatus written in (19) is an image processing apparatus written in (17) or (18), which is characterized in that: the parameter change permission judging means obtains a difference between a parameter value after changing the parameter by calculating from the changed parameter after the adjustment stored in the changed parameter memorizing means and a parameter value at this time, and when the absolute value of the difference is not smaller than the predetermined threshold value Thd2, the parameter change permission judging means resumes changing the parameter.

(20) A method written in (20) is an image processing method written in (19), which is characterized in that: in the parameter change permission judging step, the predetermined threshold value Thd1 to stop changing the parameter the predetermined threshold value Thd2 to resume changing the parameter satisfy the following formula:

$$Thd2 > Thd1$$

An apparatus written in (20) is an image processing apparatus written in (19), which is characterized in that: in the parameter change permission judging means, the predetermined threshold value Thd1 to stop changing the parameter the predetermined threshold value Thd2 to resume changing the parameter satisfy the following formula:

$$Thd2 > Thd1$$

(21) A method written in (21) is an image processing method written in (17), which is characterized in that: the parameter change permission judging step obtains a ratio Rp of a parameter value after changing the parameter by calculating from the changed parameter after the adjustment stored in the changed parameter memorizing step to a parameter value at this time, and when the absolute value of the ratio Rp satisfies the condition of $(1-Thd3 < Rp < 1+Thd3)$ with regard to the predetermined threshold value Thd3, the parameter change permission judging step stops changing the parameter.

An apparatus written in (21) is an image processing apparatus written in (17), which is characterized in that: the parameter change permission judging means obtains a ratio Rp of a parameter value after changing the parameter by calculating from the changed parameter after the adjustment stored in the changed parameter memorizing step to a parameter value at this time, and when the absolute value of the ratio Rp satisfies the condition of $(1-Thd3 < Rp < 1+Thd3)$ with regard to the predetermined threshold value Thd3, the parameter change permission judging means stops changing the parameter.

(22) A method written in (22) is an image processing method written in (17) or (21), which is characterized in that: the parameter change permission judging step obtains a ratio Rp of a parameter value after changing the parameter by calculating from the changed parameter after the adjustment stored in the changed parameter memorizing step to a parameter value at this time, and when the absolute value of the ratio Rp satisfies the condition of (1−Thd4>Rp or 1+Thd4<Rp) with regard to the predetermined threshold value Thd4, the parameter change permission judging step resumes changing the parameter.

An apparatus written in (22) is an image processing apparatus written in (17) or(21), which is characterized in that: the parameter change permission judging means obtains a ratio Rp of a parameter value after changing by calculating the parameter from the changed parameter after the adjustment stored in the changed parameter memorizing step to a parameter value at this time, and when the absolute value of the ratio Rp satisfies the condition of (1−Thd4>Rp or 1+Thd4<Rp) with regard to the predetermined threshold value Thd4, the parameter change permission judging means resumes changing the parameter.

(23) A method written in (23) is an image processing method written in (22), which is characterized in that: in the parameter change permission judging step, the predetermined threshold value Thd3 to stop changing the parameter the predetermined threshold value Thd4 to resume changing the parameter satisfy the following formula:

Thd4>Thd3

An apparatus written in (23) is an image processing apparatus written in (22), which is characterized in that: in the parameter change permission judging means, the predetermined threshold value Thd3 to stop changing the parameter the predetermined threshold value Thd4 to resume changing the parameter satisfy the following formula:

Thd4>Thd3

(24) A method written in (24) is an image processing method written in any one of (13) to (22), which is characterized in that: it further comprises a parameter adjustment amount memorization permission judging step to judge whether or not the parameter adjustment amount is memorized in the parameter adjustment amount memorizing step.

An apparatus written in (24) is an image processing apparatus written in any one of (13) to (22), which is characterized in that: it further comprises a parameter adjustment amount memorization permission judging means to judge whether or not the parameter adjustment amount is memorized in the parameter adjustment amount memorizing means.

(25) A program described in (25) is an image processing program to execute an image processing for a radiation image having a signal corresponding to the irradiation dose of the radiation transmitted the subject, and is characterized in that: it comprises routines to execute each step of image processing described in (1) to (24).

As explained above, the following effects can be obtained by the present invention.

(1) In these invention, when the image processing for obtaining the image adequate for the diagnosis is conducted on the radiation image having the signal corresponding to the irradiation dose of the radiation transmitted the subject, the parameter corresponding to the processing condition is previously stored for each set processing condition, and the image processing is conducted on the radiation image by the parameter corresponding to the stored processing condition, and when the adjustment of the processing condition is further conducted on the processed image on which the image processing is conducted, the adjusted parameter adjustment amount is stored, and the parameter is changed by the stored parameter adjustment amount.

As this result, because the parameter is gradually changed by the adjustment amount adjusted by the user, the stored parameter approaches the condition of the image processing which is desired by the user, and the optimum image processing condition can be determined without manually conducting the prior adjustment of the image processing condition by the user.

(2) In these inventions, the parameter adjustment amount is stored for each of a plurality of image processing conditions, and the parameter is changed for each image processing condition according to the adjustment amount stored for each image processing condition. As this result, each of a plurality of image processing conditions set according to the photographing position or photographing direction can be optimized.

(3) In these inventions, relating to the parameter adjustment amount for each of the adjusted processing condition, the parameter adjustment amount for a plurality of number of times of image processing is stored for each image processing, and the parameter adjustment amounts for a predetermined number of times in which the absolute value is large in the parameter adjustment amounts, are excluded, and the parameter is changed. As this result, the possibility that the setting of the image processing condition which is not optimum, is conducted by using the adjustment amount of the image processing condition when the erroneous processing is conducted, can be reduced.

(4) In these inventions, relating to the parameter having a continuous value, the parameter is changed so that the average value of the stored parameter adjustment amounts of a plurality of times is decreased. As this result, even when the parameter which determines the image processing condition is continuous, the optimum image processing condition can be determined.

(5) In these inventions, when the image processing for obtaining the image adequate for the diagnosis is conducted on the radiation image having a signal corresponding to the irradiation dose of the radiation transmitted the subject, the parameter corresponding to the processing condition is previously stored for each set processing condition, and the image processing is conducted on the radiation image by the parameter corresponding to the stored processing condition, and when the adjustment of the processing condition is further conducted on the processed image on which the image processing is conducted, the parameter adjustment amount is stored, and the parameter is changed by the parameter adjustment amount. And then, a judgment (parameter change permission judgment) to stop changing the parameter when a predetermined condition is satisfied, is conducted.

As this result, because the parameter up to that time is gradually changed by the parameter after adjustment adjusted by the user, the stored parameter approaches the condition of the image processing wished by the user, and the optimum image processing condition can be determined without manually conducting the prior adjustment of the image processing condition by the user (change permissible condition=learning function ON). At this time, when the adjustment amount adjusted by the user becomes small to satisfy the predetermined condition, it presumes that it becomes close to an optimum image processing condition, changing the parameter stated above is stopped (change impermissible condition=learning function OFF).

As a result, in the case that the image processing condition for the radiation image is automatically changed by utilizing the adjustment result by the user, since the changing is stopped when the difference between parameters before and after the adjustment is converged to become not larger than the predetermined value, the optimization become (6) In these inventions, in (5), a difference between a parameter value after changing by calculating from the parameter adjustment amount stored in the parameter adjustment amount memorizing step and a parameter value at this time is obtained and when the absolute value of the difference is not larger than the predetermined threshold value Thd1, the predetermined condition is deemed as being satisfied and changing the parameter is stopped.

As a result, the image processing condition for the radiation image is automatically changed by utilizing the adjustment result by the user, and by stopping the changing the parameter when the adjustment is converged on the predetermined condition, the optimization become possible automatically under the stable condition.

(7) In these inventions, after changing the parameter is stopped in (6) as the predetermined condition is satisfied, a difference between a parameter value after changing by calculating from the parameter adjustment amount stored in the parameter adjustment amount memorizing step and a parameter value at this time is further obtained, and when the absolute value of the difference is not smaller than the predetermined threshold value Thd2, the predetermined condition is deemed as being released and changing the parameter is resumed.

As a result, in the case that the image processing condition for the radiation image is automatically changed by utilizing the adjustment result by the user, the changing is stopped temporally when the adjustment is converged. However, when the difference between parameters before and after the adjustment exceeds a predetermined value, since a deviation is caused between the set condition and a condition desired by a user, the changing is resumed so that the optimization become possible automatically under the stable condition.

(8) In these inventions, in (7), when the automatic stop and the automatic resumption are conducted in changing the parameter, the threshold value Thd2 for resuming is set to be larger than the threshold value Thd1 for stopping.

As a result, by setting the threshold value to stop and the threshold value to resume, stop and resumption are not repeated unnecessarily so that the optimization becomes possible automatically under the stable condition.

(9) In these inventions, in (5), a ratio Rp of a parameter value after changing by calculating from the parameter adjustment amount stored in the parameter adjustment amount memorizing step to a parameter value at this time is obtained, and when the ratio Rp satisfies the condition of (1−Thd3<Rp<1+Thd3), the predetermined condition is deemed as being satisfied and changing the parameter is stopped.

As a result, in the case that the image processing condition for the radiation image is automatically changed by utilizing the adjustment result by the user, since the changing is stopped when the ratio between parameters before and after the adjustment is converged to become within the predetermined range, the optimization become possible automatically under the stable condition. Incidentally, in this case, since the judgment is conducted based on the ratio, not the difference, even if the absolute value of the parameter fluctuates greatly, a proper judgment can be possible.

(10) In these inventions, after changing the parameter is stopped in (9) as the predetermined condition is satisfied, further a ratio Rp of a parameter value after changing by calculating from the parameter adjustment to a parameter value at this time is obtained, when the ratio Rp satisfies the condition of (1−Thd4>Rp or 1+Thd4<Rp), the predetermined condition is deemed as being released and changing the parameter is resumed.

As a result, in the case that the image processing condition for the radiation image is automatically changed by utilizing the adjustment result by the user, the changing is stopped temporally when the adjustment is converged. However, when the difference between parameters before and after the adjustment exceeds a predetermined value, since a deviation is caused between the set condition and a condition desired by a user, the changing is resumed so that the optimization become possible automatically under the stable condition. Incidentally, in this case, since the judgment is conducted based on the ratio, not the difference, even if the absolute value of the parameter fluctuates greatly, a proper judgment can be possible.

(11) In these inventions, in (10), when the automatic stop and the automatic resumption are conducted, the threshold value Thd4 for resuming is set to be larger than the threshold value Thd3 for stopping.

As a result, by setting the threshold value to stop and the threshold value to resume, stop and resumption are not repeated unnecessarily so that the optimization become possible automatically under the stable condition. Incidentally, in this case, since the judgment is conducted based on the ratio, not the difference, even if the absolute value of the parameter fluctuates greatly, a proper judgment can be possible.

(12) In these inventions, with regard to the parameter adjustment in any one of (1) to (11), it is judged whether or not the parameter adjustment amount is memorized. Namely, by providing a means to limit data for use in learning the parameter, since data not to be used in learning by nature of them can be eliminated from learning, learning the parameter can be conducted efficiently. As a result, when optimization is conducted automatically, by specifying a target to which the image adjustment result is, even if a plurality of image processing apparatuses and plural users use, adjustment for the image processing condition can be conducted simply stably.

(13) In these invention, when the image processing for obtaining the image adequate for the diagnosis is conducted on the radiation image having the signal corresponding to the irradiation dose of the radiation transmitted the subject, the parameter corresponding to the processing condition is previously stored for each set processing condition, and the image processing is conducted on the radiation image by the parameter corresponding to the stored processing condition, and when the adjustment of the processing condition is further conducted on the processed image on which the image processing is conducted, the parameter after the adjustment is stored, and the parameter is changed by the stored parameter after the.

As this result, because the parameter is gradually changed by the parameter after the adjustment adjusted by the user, the stored parameter approaches the condition of the image processing which is desired by the user, and the optimum image processing condition can be determined without manually conducting the prior adjustment of the image processing condition by the user.

(14) In these inventions, relating to the parameter having a discrete value, it is determined by the mode of the stored parameter values after the adjustments of a plurality of times. As this result, even when the parameter which determines the image processing condition is discrete, the optimum image processing condition can be determined.

(15) In these inventions, relating to a parameter having a continuous value, the difference between the average value of the parameters after adjustments of a plurality of times and the value of the concerned parameter, is decreased. As this result, even when the parameter which determines the image processing condition is continuous, the optimum image processing condition can be determined.

(16) In these inventions, relating to a parameter having a continuous value, the parameter is changed so that the average value of the parameters after adjustments of a plurality of times is decreased. As this result, even when the parameter which determines the image processing condition is continuous, the optimum image processing condition can be determined.

(17) In these inventions, when the image processing for obtaining the image adequate for the diagnosis is conducted on the radiation image having a signal corresponding to the irradiation dose of the radiation transmitted the subject, the parameter corresponding to the processing condition is previously stored for each set processing condition, and the image processing is conducted on the radiation image by the parameter corresponding to the stored processing condition, and when the adjustment of the processing condition is further conducted on the processed image on which the image processing is conducted, the parameter after the adjustment is stored, and the parameter is changed by this parameter after the adjustment. And then, a judgment (parameter change permission judgment) to stop changing the parameter when a predetermined condition is satisfied, is conducted.

As this result, because the parameter up to that time is gradually changed by the parameter after adjustment adjusted by the user, the stored parameter approaches the condition of the image processing wished by the user, and the optimum image processing condition can be determined without manually conducting the prior adjustment of the image processing condition by the user (change permissible condition=learning function ON). At this time, when the adjustment amount adjusted by the user becomes small to satisfy the predetermined condition, it presumes that it becomes close to an optimum image processing condition, changing the parameter stated above is stopped (change impermissible condition=learning function OFF).

As a result, in the case that the image processing condition for the radiation image is automatically changed by utilizing the adjustment result by the user, since the changing is stopped when the difference between parameters before and after the adjustment is converged to become not larger than the predetermined value, the optimization become possible automatically under the stable condition.

(18) In these inventions, in (5), a difference between a parameter value after the adjustment by calculating from the parameter after the adjustment stored in the revised parameter memorizing step and a parameter value at this time is obtained and when the absolute value of the difference is not larger than the predetermined threshold value Thd1, changing the parameter is stopped.

As a result, the image processing condition for the radiation image is automatically changed by utilizing the adjustment result by the user, and by stopping the changing the parameter when the adjustment is converged on the predetermined condition, the optimization become possible automatically under the stable condition.

(19) In these inventions, in (17) and (18), a difference between a parameter value after the adjustment by calculating from the parameter after the adjustment stored in the revised parameter adjustment memorizing step and a parameter value at this time is obtained, and when the absolute value of the difference is not smaller than the predetermined threshold value Thd2, changing the parameter is resumed.

As a result, in the case that the image processing condition for the radiation image is automatically changed by utilizing the adjustment result by the user, the changing is stopped temporally when the adjustment is converged. However, when the difference between parameters before and after the adjustment exceeds a predetermined value, since a deviation is caused between the set condition and a condition desired by a user, the changing is resumed so that the optimization become possible automatically under the stable condition.

(20) In these inventions, in (19), when the automatic stop and the automatic resumption are conducted in changing the parameter, the threshold value Thd2 for resuming is set to be larger than the threshold value Thd1 for stopping.

As a result, by setting the threshold value to stop and the threshold value to resume, stop and resumption are not repeated unnecessarily so that the optimization becomes possible automatically under the stable condition.

(21) In these inventions, in (17), a ratio Rp of a parameter value after the adjustment by calculating from the parameter after the adjustment stored in the revised parameter memorizing step to a parameter value at this time is obtained, and when the ratio Rp satisfies the condition of (1−Thd3<Rp<1+Thd3), changing the parameter is stopped.

As a result, in the case that the image processing condition for the radiation image is automatically changed by utilizing the adjustment result by the user, since the changing is stopped when the ratio between parameters before and after the adjustment is converged to become within the predetermined range, the optimization become possible automatically under the stable condition. Incidentally, in this case, since the judgment is conducted based on the ratio, not the difference, even if the absolute value of the parameter fluctuates greatly, a proper judgment can be possible.

(22) In these inventions, in (17) and(21), a ratio Rp of a parameter value after the adjustment by calculating from the parameter after the adjustment stored in the revised parameter memorizing step to a parameter value at this time is obtained, when the ratio Rp satisfies the condition of (1−Thd4>Rp or 1+Thd4<Rp), changing the parameter is resumed.

As a result, in the case that the image processing condition for the radiation image is automatically changed by utilizing the adjustment result by the user, the changing is stopped temporally when the adjustment is converged. However, when the difference between parameters before and after the adjustment exceeds a predetermined value, since a deviation is caused between the set condition and a condition desired by a user, the changing is resumed so that the optimization become possible automatically under the stable condition. Incidentally, in this case, since the judgment is conducted based on the ratio, not the difference, even if the absolute value of the parameter fluctuates greatly, a proper judgment can be possible.

(23) In these inventions, in (22), when the automatic stop and the automatic resumption are conducted, the threshold value Thd4 for resuming is set to be larger than the threshold value Thd3 for stopping.

As a result, by setting the threshold value to stop and the threshold value to resume, stop and resumption are not repeated unnecessarily so that the optimization becomes possible automatically under the stable condition. Incidentally, in this case, since the judgment is conducted based on the ratio, not the difference, even if the absolute value of the parameter fluctuates greatly, a proper judgment can be possible.

(24) In these inventions, with regard to the parameter adjustment in any one of (13) to (23), it is judged whether or not the parameter adjustment amount is memorized. Namely, by providing a means to limit data for use in learning the parameter, since data not to be used in learning by nature of them can be eliminated from learning, learning the parameter can be conducted efficiently. As a result, when optimization is conducted automatically, by specifying a target to which the image adjustment result is, even if a plurality of image processing apparatuses and plural users use, adjustment for the image processing condition can be conducted simply stably.

EMBODIMENT

Referring to the attached drawings, the best mode of practicing the present invention will be described in detail.

A preferred embodiment of an image processing method, image processing apparatus, and image processing program in the best mode to practice the invention will be described below. The present invention, however, is not limited to this.

Each means of the present embodiment can be configured by hardware, firmware, or software. Therefore, there is shown, in FIG. 1, a functional block diagram according to a procedure to process each step, means, and routine.

Further, FIG. 1 being a functional block diagram can also be used as a flow chart to understand each embodiment of an image processing method, image processing apparatus, and image processing program.

The structure and operation (processing) of the present embodiment will be described in detail below, classifying into items (1)-(9). The detailed description will be given also referring to a flowchart shown in FIG. 5.

(Overall Structure and Flow of Processing)

Overall Structure:

There are arranged in the overall structure shown in FIG. 1, radiation image input means 10, image processing condition setting means 20, parameter memorizing means 30, image processing condition adjusting means 40, parameter adjustment amount memorizing means 50, parameter changing means 60, parameter alteration permission determination means 70, control means 80, and parameter adjustment amount storing permission determination means 90.

Each section (each means) in FIG. 1 described above is a component of the image processing apparatus, and also configures each respective step of the image processing method and each routine of the image processing program. The aforesaid image processing apparatus can be configured with a combination of a CPU and a memory, and a processing program, and also can be implemented by utilizing programmable gate arrays and the like.

Flow of Processing:

The radiation image input means 10 obtains image data generated by radiation photographing. The obtained image data is transmitted to the control means 80.

From the obtained image data, the control means 80 forms a reduced image for image processing, and a reduced image for display. Then, the reduced image for image processing is sent to the image processing condition setting means 20, and the reduced image for display is sent to the image processing condition adjusting means 40. Further, the control means 80 obtains information on the photographed part, photographing direction, etc. from a user interface or the like, and also sends this information to the image processing condition setting means 20. The control means 80 serves as image processing means and performs image processing on the image data, using image processing conditions determined by the image processing condition adjusting means 40 which will be described later. The image having been subjected to image processing is output through a network, and film output or displayed on a monitor for diagnosis. On the other hand, the control means 80 transmits image processing conditions determined by the image processing condition adjusting means. 40 and image processing conditions set by the image processing condition setting means 20 to the parameter adjustment amount storing permission determination means 90.

The image processing condition setting means 20 specifies necessary image processing conditions, according to the information on the photographed part, the photographing direction, etc. obtained from the control means 80, and calls parameters for the image processing conditions from the parameter memorizing means 30. Then, based on the image processing conditions and the reduced image for image processing, unique image processing conditions such as an optimum gradation conversion curve are determined for each image data. The determined image processing conditions are transmitted to the image processing condition adjusting means 40.

The image processing condition adjusting means 40 performs image processing on the reduced image for display, using the unique image processing conditions, and displays the processed image. While confirming the processed image, the user can adjust parameters relating to image processing such as density, contrast, and edge enhancement of the image. When the user carries out parameter adjustment, the image processing condition adjusting means 40 compares default image processing conditions and image processing conditions corresponding to the changed image, and determines the adjustment amounts of the parameters and parameter values after the change. The determined parameters are transmitted to the control means 80.

The parameter adjustment amount memorizing means 50 stores the adjustment amounts of the parameters and the parameter values after the change, which was obtained above, for the respective image processing conditions.

The parameter changing means 60 recalculates parameters, for the respective image processing conditions, that determine image processing conditions each time image processing has been performed a predetermined number of times. The calculated parameters are sent to the image processing parameter memorizing means 30, and image processing is performed using these parameters from next time.

The parameter alteration permission determination means 70 determines, for the respective image processing conditions, whether to continue (permission), stop (no permission), or resume if already stopped, changing of parameters that define image processing conditions each time image processing has been performed a predetermined number of times.

The parameter adjustment amount storing permission determination means 90 determines, according to internal information, whether or not image processing conditions (parameters) transmitted from the control means 80 are objects to be used for recalculation of parameters, and if determined to be the objects used for recalculation of parameters, the parameter adjustment amount storing permission determination means 90 transmits these parameters to the parameter adjustment amount memorizing means 50.

(Details of Each Means, Step, and Routine)

(1) Radiation Image Input:

The radiation image input means 10 to be used for a radiation image input step detects radial rays having passed through a subject, and obtains them as image signals. Specific examples of such radiation image input means are disclosed in Tokkai No. H11-142998 and Tokkai No. 2002-156716, in which a stimulable phosphor plate is employed. Further, radiation image input means using a flat panel detector (FPD) as an input device are disclosed in Tokkai No. H06-342098, in which detected X-rays are directly converted into electric charges and obtained as image signals, and disclosed in Tokkai No. H09-90048, which achieves an indirect system that converts detected X-rays into lights and thereafter receives the lights to convert them into electric charges.

The actual size of each pixel in the obtained image data is in the range from 0.04 mm to 0.2 mm approximately. In the present embodiment, it is assumed that gradation steps are represented by 12 bits, that is, values 0 through 4095. Further, in some systems, image data obtained from such a device is received through a network. The obtained image data is sent to the control means 80.

(2) Control:

Control means 80, which performs various controls, first forms a reduced image for image processing and a reduced image for display from the obtained image data. This aims at performing a succeeding process at a high speed, and reducing a hardware resource necessary for computation.

In a reduced image, it is desirable that the size of a single pixel corresponds to an actual size of 0.5 mm to 5 mm of a subject. If the size of a single pixel is smaller than 0.5 mm, too many pixels are included in the reduced image, and objects such as speeding up cannot be attained. On the other hand, without using a monitor having a large number of display pixels, it is difficult to display the entire image on a screen at one time. If the corresponding actual size is larger than 5 mm, the structure of the subject cannot be observed well, making it difficult to obtain optimum conditions for image processing. In the present embodiment, both for image processing and for display, the dimension per pixel is set corresponding to 1 mm in the actual size of a subject.

Next, information on the photographed part, the photographing direction, etc. are obtained from a user interface. This kind of information is obtained by the user's specifying the photographing part and so on. For example, as shown in FIGS. 2A and 2B, using user interface 401 of the image processing apparatus which is provided with both a display section and a touch panel, when a button (hatching portion) indicated as "abdomen" in FIG. 2A is pressed, or, in FIG. 2B, when the button "chest" is pressed and then the button "front" is pressed on pop up screen 402 to select a photographing direction, a subject number bn is obtained, wherein the subject number bn corresponds, one to one, to a set of image processing conditions linked to the respective buttons.

Next, when image processing conditions are set by the image processing condition setting means 20, the control means 80 obtains parameters that correspond to the image processing conditions from the image processing condition setting means 20 and holds the parameters in a temporary holding means such as a cash memory provided in the control means 80.

The control means 80 performs image processing on the reduced image for display, using these image processing conditions. The reduced image for display subjected to the image processing is transmitted to the image processing condition adjusting means 40 from the control means 80.

Figure 5:
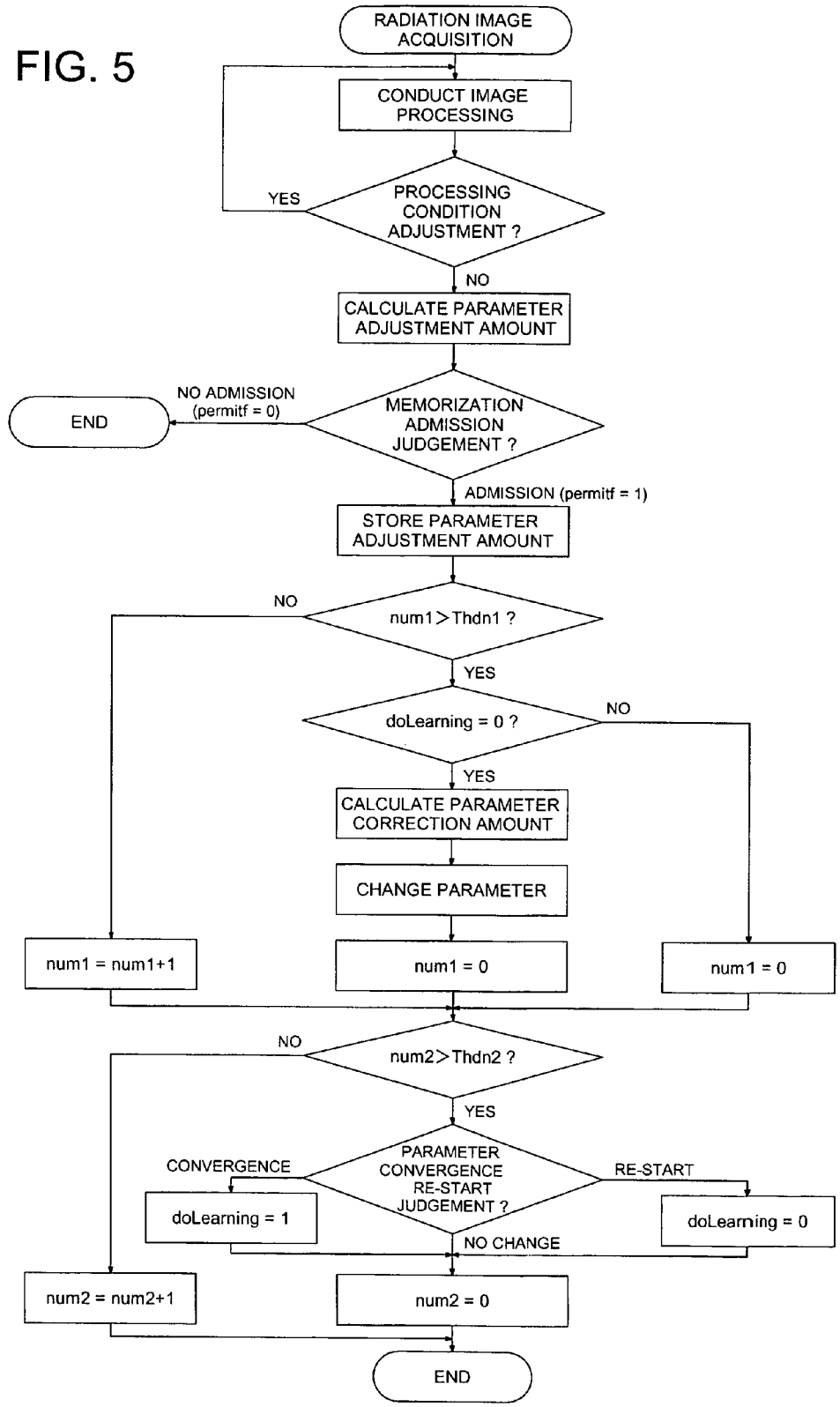
FIG. 5 is a flow chart showing an embodiment of the present invention.

From then, each time a parameter is altered by the image processing condition adjustment setting means 40, the control means 80 receives a parameter that corresponds to an image processing condition after the alteration from the image processing condition setting means 20, and again performs image processing on the reduced image for display, applying the parameter that corresponds to the image processing condition after the alteration (S1 in FIG. 5). The image processing condition mentioned above which is held in the control means 80 will be described later.

When adjustment of the image processing conditions is terminated and the control means 80 receives a termination notice from the image processing condition adjusting means 40, the control means 80 performs image processing on the original image data by the use of the image processing conditions that the control means 80 is holding at present, and outputs an image. Further, the control means 80 transmits a set of the holding parameters to the parameter adjustment amount memorizing means 50 through the parameter adjustment amount storing permission determination means 90.

(3) Image Processing Condition Setting:

The image processing condition setting means 20 for setting image processing conditions reads a specific set of parameters for image processing from the image processing parameter memorizing means 30, according to the subject number bn obtained from the control means 80.

Calling of the parameter set is conducted as follows. The image processing condition setting means 20 has a table that relates the subject number bn with a memory address on the image processing parameter memorizing means 30 which stores a series of parameters related to the image processing conditions corresponding to the subject number bn. Then, when the subject number bn is obtained, the table is referred and s set of a series of parameters is read from the image processing parameter memorizing means 30.

These parameters include the followings.

3-a) Parameter used in an algorithm for detecting an irradiated field region from an image 3-b) Parameter for selecting a plurality of algorithms for finding a specific structure from a subject photographed in the irradiated field region 3-c) Parameter used in an algorithm for finding the specific structure 3-d) Reference signal value parameter that is set so that the image of the specific structural part comes to have a predetermined density after image processing Specifically, reference signal value parameters are as follows.

3-d-1) Cumulative frequency ratios h1, h2 in a cumulative histogram of signal values in a region of interest 3-d-2) Signal value D1, in an output image, taken by a signal value corresponding to h1

3-d-3) Signal value D2, in the output image, taken by a signal value corresponding to h2

3-d-4) Contrast adjustment coefficient k 3-e) Gradation conversion curve stdLUT to be a reference Specifically, a gradation conversion curve stdLUT is a one-dimensional array stdLUT [s] of which element values are respective output signal values corresponding to input signal value s [s=0, 1, . . . , 4095].

3-f) Parameter that define the enhancement degree of the edge of the image

Specifically, parameters herein include the following.

Enhancement type typ

Enhancement coefficients $\beta 0$, $\beta 1$, . . . $\beta n$, for respective frequency bandwidths When various parameters as described above are read from the image processing parameter memorizing means 30, image processing conditions are set as below by the image processing condition setting means 20, according to the parameters.

The procedure is specifically as follows.

3-f-i) Divisional pattern recognition processing is performed on the reduced image so that a region including a specific irradiated field region is extracted. Next, irradiated field recognition processing is performed on the extracted region, and thus, information only on the irradiated field region is obtained. Incidentally, a method of divisional pattern recognition processing is disclosed in Tokkai No. 2000-83938, and a method of irradiated field recognition processing is disclosed in Tokkai No. 2000-23952.

3-f-ii) According to the information on the irradiated field region obtained by the irradiated field recognition processing, a region of interest (ROI) is set as a region to be paid attention to for image diagnosis. Setting of the ROI is carried out by analyzing the reduced image, based on the anatomical structure of the subject. Methods of setting ROI are disclosed in Tokkai NO. S63-262141, Tokkai NO. H04-341246, Tokkai No. H08-62751, and in Tokkai No. 2001-29335.

3-f-iii) When the ROI is set, a reference signal value is determined according to statistical information relating to signal values inside the ROI. The statistical information includes the average value and the mode of the pixels included in the ROI, and the signal value corresponding to a predetermined ratio of the cumulative histogram of signal values. When a reference signal value is determined, a previously prepared gradation conversion curve is customized according to the reference signal value, and a gradation conversion curve suitable for the input image is obtained.

As such a gradation conversion method, methods disclosed in Tokkai No. H07-178076 and Tokkai No. H08-62751 can be employed, for example.

Specifically, a gradation conversion curve LUT [] is calculated in the following procedure, for example.

First, a cumulative histogram is calculated according to signal values in the ROI.

Then, a cumulative frequency is found starting from smaller signal values, and a signal value std1 that attains a predetermined ratio hi to the total number of pixels Nroi in the region of interest is found.

Next, a cumulative frequency is found again starting from smaller signal values, and a signal value std2 that attains a predetermined ratio h2 to the total number of pixels Nroi in the region of interest is found.

On the one hand, input signal values s'1 and s'2 that correspond respectively to an output signal value D1 to be taken by std1 and to an output signal value D2 to be taken by std2 are found from the gradation conversion curve stdLUT [] which is a reference.

Then, a conversion coefficient a and a conversion coefficient b are found from the following expressions (1) and (2).

$$a = (std2 - std1)/(s'2 - s'1) \quad (1)$$

$$b = (std1 - s'1) \quad (2)$$

Then, in order to optimize the gradation conversion curve for each image, input signal values of the gradation conversion curve are normalized with respect to the values s ranging from 0 to 4095, using the conversion coefficients a and b, and a contrast adjustment coefficient k. The input signal values s' after the normalization are calculated by the following expression (3).

$$s' = k \cdot a \cdot s + b \quad (3)$$

Then, a gradation conversion curve LUT [s'] in which the element number value s of the stdLUT [] is replaced by s' is generated. Herein, when s'<0, and s'>4095 (=$2^{12}$−1), such values are neglected, (because the input signal value s' can have values only in the range 0-4095), and interpolation is performed so that s' have values with an increment of 1.

Further, in case that h2 is not designated, (for example, making a rule not to refer to h2, when h2<0), std1 is found in the same manner as described above, and then b is calculated by the following expression (4).

$$b = (std1 - s'1) \quad (4)$$

Then, s' are obtained by $$s' = k \cdot s + b \quad (5)$$

Then, a gradation conversion curve LUT[s'] can be generated, wherein the element number values s of stdLUT(s) are replaced by s'.

In the same manner, in case that h1 is not designated, std2 is found, and then b is calculated by the following expression (6).

$$b = (std2 - s'2) \quad (6)$$

Then, s' are obtained by $$s' = k \cdot s + b \quad (7)$$

Then, a gradation conversion curve LUT[s'] can be generated, wherein the element number values s of stdLUT(s) are replaced by s'.

3-f-iv) Further, apart from the gradation conversion processing, enhancement processing by which edges are enhanced for a clearer view of a detailed structure. As the enhancement processing, there are disclosed methods by a pyramid algorithm in Tokkai No. 2002-183726, Tokkai No. 2002-183727.

In a pyramid algorithm, a plurality of images in different frequency bandwidths can be obtained by repeated generation of differential images between unsharp images subjected to a Laplacian filter, for example, and an original image, then conversion is performed on the images of the respective frequency bandwidths, and thereafter, the images are added, thereby allowing fine-enhancement processing.

For this conversion processing, there is a method in which, for the respective differential images that represent the corresponding i-th frequency bandwidths, pixel signal values si' are calculated by conversion of pixel signal values si of the respective differential images in such a manner that each si' is obtained by si'=$\beta$j·si. Then, by changing the combination of this $\beta$j, different enhancement degrees can be given to the respective frequency bandwidths.

The obtained image processing conditions including the gradation conversion curve, the signal values D1 and D2, the contrast coefficient k, the edge enhancement type typ, and the edge emphatic degrees βj are transmitted to the control means 80.

On the other hand, when image processing conditions are adjusted by the image processing condition adjusting means 40, the image processing condition setting means 20 receives an adjustment value Δs of the reference signal value, an adjustment value Δr of contrast, and the like, from the image processing condition adjusting means 40, wherein the adjustment values correspond to the adjustment.

The image processing condition setting means 20 performs processing represented by the following expressions on the parameters D1 and D2, and the like.

$$D1'=D1+\Delta s \quad (8)$$

$$D2'=D2+\Delta s \quad (9)$$

$$k'=k+\Delta r \cdot k \quad (10)$$

Then, expressions (1) to (7) are calculated again, and the gradation conversion curve LUT is regenerated. When the gradation conversion curve is regenerated, the gradation conversion curve LUT after the change, and the parameters D1', D2', and k' used for the regeneration are transmitted to the control means 80.

Also, when the image processing condition adjusting means 40 receives an adjustment amount Δb of the edge enhancement degree, this Δb is transmitted to the image processing condition setting device 20. Then, the image processing condition setting means 20 alters the enhancement coefficient, according to the following expression, and transmits the altered enhancement coefficients βj' to the control means 80.

$$\beta j' = \beta j + \Delta b \quad (11)$$

Further, when the frequency enhancement type number typ is changed by the image processing condition adjusting means 40, the image processing condition setting means 20 calls a corresponding set of βj from the parameter memorizing means 30, according to the enhancement type number typ received from the image processing condition adjustment setting means 40, and transmits the set of βj to the control means 80 together with the enhancement type number typ.

Incidentally, the control means 80 holds the subject number bn, the parameters D1, D2, k, βj, and typ, which are initially set, and the parameters D1', D2', k', βj', and typ', which are set after the last adjustment of image processing conditions, using temporary holding means.

(4) Parameter Storing:

In the parameter memorizing means 30 for storing parameters stores a set of image processing conditions for each subject number bn, wherein each set of image processing conditions includes the following parameters at least.

4-a) Parameter used in an algorithm for detecting an irradiated field region in an image 4-b) Parameter for selecting a plurality of algorithms for finding a specific structure from a subject photographed in the irradiated field 4-c) Parameter used in an algorithm for finding the specific structure 4-d) Reference signal value parameter that is set so that the image of the specific structural part comes to have a predetermined density after image processing Specifically, the reference signal value parameters are ratios h1, h2 of the cumulative frequency in the cumulative histogram of the signal values in the region of interest, the signal value D1 which is taken by a signal value corresponding to h1 in the output image, and the signal value D2 which is taken by a signal value corresponding to h2 in the output image.

4-e) Gradation conversion curve stdLUT which serves as a reference

Specifically, the Gradation conversion curve stdLUT is a one-dimensional array stdLUT [s] of which element values are the output signal values corresponding to the input signal values of s [s=0, 1, . . . 4095].

4-f) Parameter for determining the enhancement degree of the edges of the image

Specifically, parameters for determining the enhancement degree are as follows.

Enhancement type typ

Figure 3:
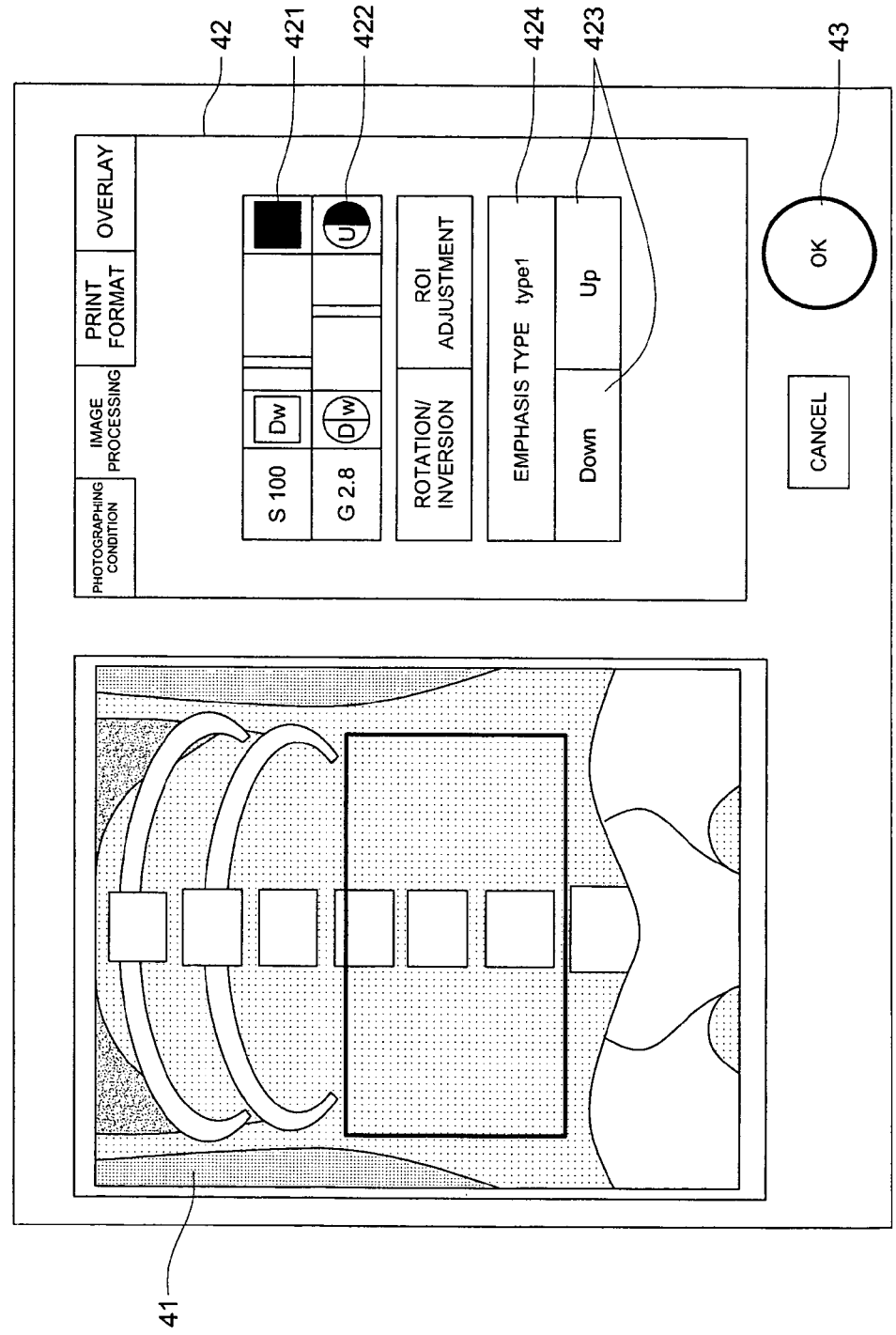
FIG. 3 is a schematic diagram showing a situation of the processing condition adjustment in an embodiment of the present invention.

Enhancement coefficients $\beta 0, \beta 1, \ldots \beta n$ for each frequency bandwidth Each parameter is properly altered, according to adjustment information from the parameter changing means 60. Further, apart from them, a set of initial setting enhancement coefficients $\beta 0, \beta 1, \ldots \beta n$ is stored for each enhancement type (5) Image Processing Condition Adjustment:

The image processing condition adjusting means 40 for adjusting image processing conditions is comprised of image display means 41 for displaying a reduced image subjected to image processing and altering means 42 for input of alteration of contrast or the like (refer to FIG. 3).

First, the image display means 41 displays the reduced image obtained from the control means 80. Then, simultaneously, the altering means 42 displays a reference signal value, or a value for display that is uniquely obtained from the reference signal value (refer to FIG. 3).

While looking at an image displayed on the image display means 41 or values displayed on the altering means 42, the user changes the density, the contrast, or the edge enhancement degree so that a user-desired image can be obtained.

The altering means 42 is arranged as a user interface comprised of a display section and a touch panel as shown in FIG. 3.

Herein, the user presses density change button 421 or contrast change button 422 to change the density or the contrast of the image.

The action of "pressing" the density change button 421 or the like can be carried out by clicking a pointing device such as a mouse or a touch pen at the part to be applied on the screen. Further, if the image processing condition adjusting means 40 has a touch panel, the action can be executed by touching the part on the screen with a finger.

For a change of the density parameter, the density change button 421 is pressed once to increase or decrease the signal value of the output image by a constant value |Δs| from the input signal value to be a reference. When "Up" out of paired density change buttons 421 is pressed, Δs takes a positive value, and inversely, when "Dw" is pressed, Δs takes a negative value.

Similarly, when contrast change button 422 is pressed once, the slope of the gradation conversion curve is inclined by a constant ratio |Δr|. If "Up" out of paired contrast change buttons 422 is pressed, Δr takes a negative value, and inversely, when a contrast change button 422 "Dw" is pressed, Δr takes a positive value.

Similarly, when enhancement degree change button 423 on the altering means 42 is pressed, a constant value |Δb| is increased or decreased from each of enhancement coefficients βj (j=0, 1, . . . n) for each image of the respective frequency bandwidth. When "Up" out of paired enhancement degree change buttons 423 is pressed, Δb takes a positive value, and inversely, when "Down" is pressed, Δb takes a negative value.

In such a manner, each time a parameter is adjusted, an increasing or decreasing value Δs, Δr, or Δb of the parameter is transmitted from the image processing condition adjusting means 40 to the image processing condition setting means 20 as a parameter adjustment amount.

Figure 4:
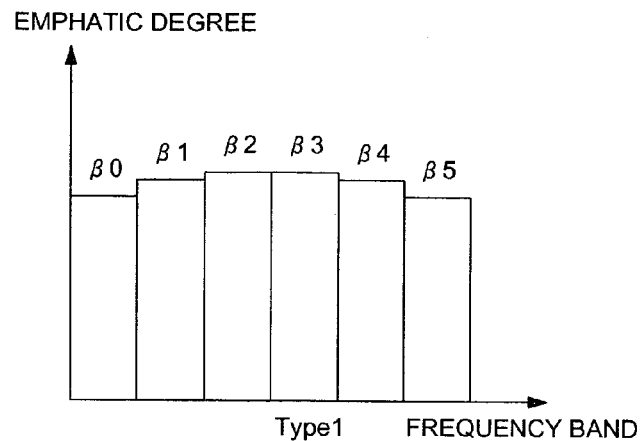
FIGS. 4(*a*) to 4(*c*) is a schematic diagram showing a situation of the emphasis coefficient for each emphasis type in an embodiment of the present invention.
Figure 4:
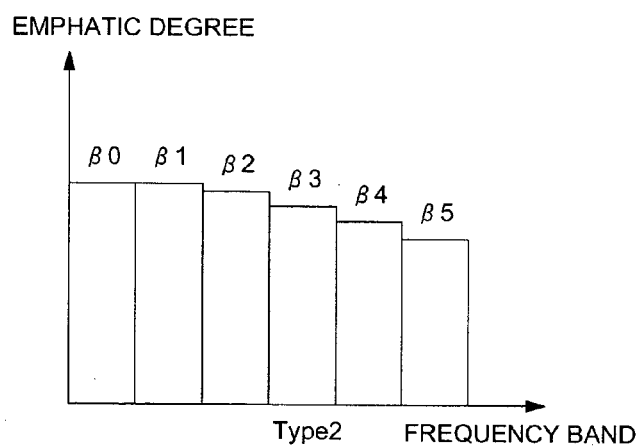
Figure 4:
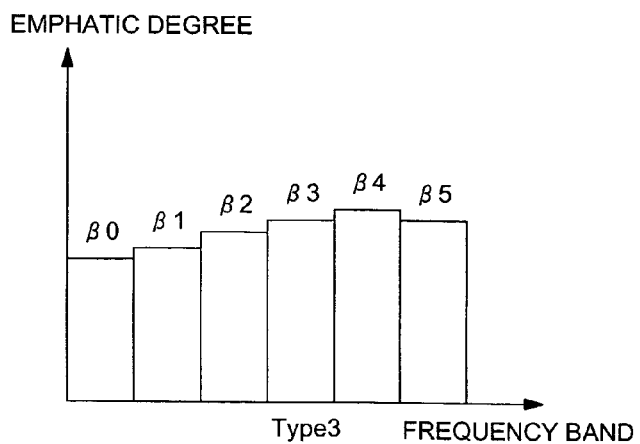

Further, when enhancement type change button 424 on the altering means 42 is pressed, the balance of each βj can be changed. For a change of the balance of βj, a type such as type 1, type 2, or type 3 is selected from a plurality of previously prepared types that are assigned to different bandwidths for enhancement, as shown in FIG. 4 for example.

From the viewpoint of easy operation, it is desirable that each time the enhancement type change button 424 is pressed once, the enhancement type is switched sequentially, such as type 1→type 2→type 3→type 1.

Specifically, each time the enhancement type change button 424 is pressed, an enhancement type number typ which corresponds 1 to 1 to a respective type (in the present embodiment, type 1=1, type 2=2, type 3=3) is transmitted to the image processing condition setting means 20.

Then, as aforementioned, the image processing condition setting means 20 recalculates an enhancement coefficient, regenerates a gradation conversion curve LUT, and transmits the gradation conversion curve after recalculation and the like to the control means 80 (S3 in FIG. 5).

Thereafter, when the image processing condition adjusting means 40 receives again a reduced image for display subjected to image processing based on the regenerated gradation conversion curve, the image display means 41 displays the reprocessed reduced image for display, allowing the user to confirm the result of changing a parameter. Finally, when the user has terminated adjustment of parameters, the user presses termination button 43, and then a termination notice is transmitted to the control means 80.

(6) Parameter Adjustment Amount Storing:

The parameter adjustment amount memorizing means 50 for storing parameter adjustment amounts stores the total amounts of the parameter adjustment amounts added by the user with the image processing condition adjusting means 40 for respective image data obtained by the radiation image input means 10 (S5 in FIG. 5).

In addition to storing the total amounts of the parameter adjustment amounts, the parameter adjustment amount memorizing means 50 stores the number of times num1 of image processing having been performed corresponding to the present subject number bn after the last change of parameter executed by the parameter changing means 60.

Further, in addition to storing the number of times num1 of image processing having been performed corresponding to the present subject number bn after the last change of parameter executed by the parameter changing means 60, the parameter adjustment amount memorizing means 50 also stores the number of times num2 of image processing having been performed corresponding to the present subject number bn after the last adjustment permission determination by the parameter alteration permission determination means 70.

Still further, doLearning is stored as a parameter adjustment permission determination flag for determining whether or not to permit adjustment of parameters.

The initial value of doLearning is '0' that allows adjustment of the parameters. On the other hand, if the value of doLearning is '1', the parameters are not adjusted, but unchanged parameters are held.

When adjustment with the image processing condition adjusting means 40 is terminated, the control means 80 transmits the subject number bn, initially set parameters D1, D2, k, βj, and typ, and the present parameters D1', D2', k' βj', and typ' having been set after the adjust ment of the image processing conditions, to the parameter adjustment amount memorizing means 50 through the parameter adjustment amount storing permission determination means 90.

Then, the parameter adjustment amount memorizing means 50 gives the adjustment total amounts of ΔD1, ΔD2, Δk, Δβ, and T of the respective parameters as follows.

$$\Delta D1 = D1' - D1 \quad (12)$$

$$\Delta D2 = D2' - D2 \quad (13)$$

$$\Delta k = k'/k \quad (14)$$

$$\Delta \beta = \beta 0'/\beta 0 \quad (15)$$

$$T = typ'/typ' = |1 \text{ (type 1)}, 2 \text{ (type 2)}, 3 \text{ (type 3)}| \quad (16)$$

The adjustment amounts herein are classified for each parameter set specified by the subject number bn. For example, the adjustment amounts to be stored are expressed as C[bn]=[Cbn1, Cbn2, ... Cbn2t], wherein each Cbni (i=1, 2, ... 2t) represents a set of parameter adjustment amounts of (i−1) times ago, and are expressed as follows.

$$Cbni = (\Delta D1i, \Delta D2i, \Delta ki, \Delta \beta, T)$$

Not only the adjustment amounts of these parameters are obtained, but also, the number of times num1 of image processing having been performed corresponding to the present subject number bn after the last call of the parameter changing means 60 is incremented by a value of 1 as follows (S7 in FIG. 5).

$$num1 = num1 + 1$$

In the same manner, the number of times num2 of image processing having been performed corresponding to the present subject number bn is incremented by 1 from that at the last call of the parameter alteration permission determination means 70 as follows.

$$num2 = num2 + 1$$

Denoting the threshold of a predetermined number of times by Thdn1 for a certain parameter set (in the present embodiment, the predetermined number threshold Thdn1 is set to 10 as the predetermined number of times), if num1>Thdn1 and doLearning=0, then C[bn] and parameters D1, D2, k, βj, and typ are transmitted to the parameter changing means 60, and adjustment of the parameters is started (S6 and steps from S8 in FIG. 5).

When parameter adjustment amounts Cbni of each time is stored in more than a predetermined number MaxNum, the parameter adjustment amount memorizing means 50 stores the parameter adjustment amounts Cbni of the respective time in the framework of the last predetermined number MaxNum, and deletes older parameter adjustment amounts Cbni before that exceeding the predetermined number MaxNum.

If doLearning=1, then the parameter changing means 60 is not called, and num1=0 is input (S9 in FIG. 5)

Denoting the threshold of a predetermined number of times by Thdn2 for the certain parameter set (in the present embodiment, the predetermined number threshold Thdn2 is set to 20 for the predetermined number of times), if num2>Thdn2, then C[bn] and parameters D1, D2, k, βj, typ, and doLearning are transmitted to the parameter alteration permission determination means 70, and determination (parameter alteration permission determination) is started (S13 and steps from S15 in FIG. 5), the determination being whether to continue or stop changing the parameters, and if already stopped, whether to resume or keep the stop of changing the parameters.

In the above description, there are shown examples in which a threshold Thdn1 of number of times of image processing is set to 10 for starting parameter adjustment (to execute a learning function), and a threshold Thdn2 of number of times of image processing is set to 20 for performing determination of alteration permission, wherein, if the following expression Thdn2>Thdn1 is satisfied, it is desirable because the learning function works within the period of alteration permission determination. Further, by setting a threshold for stopping and a threshold for resuming, there is no meaningless repeat of stopping and resuming, thereby allowing it to automatically maintain a stable state and optimize image processing.

Further, in the aforementioned case, finding Rp as the ratio of an adjusted parameter value calculated from a parameter adjustment amount, to a parameter value at the present time, it may be arranged to stop changing of parameters if Rp satisfies the expression $1-Thd3<Rp<1+Thd3$ which can be understood to satisfy a predetermined condition. As a result, in automatically changing image processing conditions for a radiation image using the results of adjustment by the user, it is possible to automatically optimize the image processing conditions in a stable state, in such a manner that changing of the image processing conditions is stopped when the above-described ratio before and after adjustment has converged to a predetermined range. Determination is performed herein not with the difference but with the ratio, which allows a proper determination even with a large variation of the absolute value of the parameter.

Still further in the above case, after a stop of changing the parameter because the predetermined condition is satisfied, finding a ratio Rp of the parameter value, the parameter value being set after adjustment and calculated from the parameter adjustment amount, to the parameter value at the present time, if 1−Thd4>Rp, or, 1+Thd4<Rp, it may be arranged to release the aforementioned predetermined condition and resume changing of the parameter. In automatically changing image processing conditions for a radiation image using the results of adjustment by the user, although changing of the image processing conditions is suspended when the above-described ratio before and after adjustment has converged to a predetermined range, it is also possible, as a result of the above, to automatically optimize the image processing conditions in a stable state, in such a manner that changing of the image processing conditions is automatically resumed when the ratio before and after adjustment has exceeded a predetermined range to have caused deviation of the present state from a state desired by the user. Determination is performed herein not with the difference but with the ratio, which allows a proper determination even with a large variation of the absolute value of the parameter.

For automatic stop and automatic resumption of changing a parameter, it is desirable that threshold Thd4 for resumption is set to a value larger than that of threshold Thd3 for stop. As a result, by setting a threshold for stopping and a threshold for resumption, meaningless repeat of stop and resumption is avoided, allowing it to automatically maintain a stable state and optimize image processing. Determination is performed herein not with the difference but with the ratio, which allows a proper determination even with a large variation of the absolute value of the parameter.

Following the last change of the parameter, a call of the parameter changing means 60 may be made each time after Cbni is renewed, or each time after Cbni is renewed n times (n≦t). If renewal is performed more frequently, optimization of the parameter is proceeded more rapidly.

Incidentally, it is desirable that means for changing above-mentioned threshold Thdn1, which is related to starting adjustment of a parameter, is separately provided. For example, in the case that the aforementioned adjustment of an image is performed in a special mode for maintenance of an image processing apparatus according to the present embodiment, if Thdn1 is set to be Thdn1=1, an image processing parameter is altered each time an image processing condition is adjusted for a single image, and therefore, it is possible to make alteration for an optimum image processing parameter at an early stage if the operation is performed by a skilled radiation engineer.

To achieve setting of a special mode for maintenance of the image processing apparatus herein, a mode determination flag for determination on whether the current mode is a usual mode or the special mode, is prepared in the control means so that the mode determination flag is set to a value that indicates the special mode, by performing a login operation at a start of the image processing apparatus with an input of a predetermined password in the login operation.

(7) Parameter Change:

When the parameter changing means 60 receives the parameter adjustment amounts C[bn], the parameter changing means 60 adjusts the parameter set for optimization.

Specifically, average values ΔD1av, ΔD2av, Δkav, and Δβav are calculated for each element of Cbni (i=1, 2, ... t).

Among the values of the respective elements, the value with the largest absolute value is excluded from the calculation of the average value. This is because it is possible that, in generating a gradation conversion curve, error recognition occurs in a irradiation field recognition processing or interest region setting processing which may generate a gradation conversion curve which is different from what is originally expected, and it is necessary to eliminate bad effects of parameters which are adjusted based on such a gradation conversion curve with error. On the other hand, a mode Tmod is found from an element T in Cbni.

Next, adjustment amounts of the parameters are calculated from the respective average values ΔD1av, ΔD2av, and Δkav. When only one of the reference signal values std1 and std2 is designated (when only one of h1 and h2 is designated), $$D1''=\eta \Delta D1av+D1 \qquad (17)$$

or $$D2''=\eta \Delta D2av+D2 \qquad (18)$$

is calculated for the designated output signal value D1 or D2, wherein obtained D1" or D2" is a renewed parameter. Herein, η is a learning coefficient that determines the rapidity of learning. The value of η is in the range of 0 to 1, and if the value is larger, the parameter is changed more rapidly. If η=0, learning is not performed.

In the same manner, from the adjustment amount Δkav of contrast, the contrast adjustment parameter k is changed as follows.

$$k''=\eta \Delta kav \cdot k \qquad (19)$$

When both of the reference signal values std1 and std2 are designated, both of the expressions (17) and (18) are calculated, and thus both of D1 and D2 are changed.

Next, in order to identify the most used one among enhancement types, the value of mode Tmod of enhancement type is examined. If Tmod is equal to a previously set enhancement type typ, each new enhancement coefficient $\beta j''$ is found as follows.

$$\beta j''=\eta\Delta\beta av+\beta j \quad (20)$$

On the one hand, if Tmod≠typ, first, a set of the enhancement coefficients $\beta j$ corresponding to the value of Tmod is called from the parameter memorizing means 30. Thereafter, expression (20) is calculated for each called $\beta j$.

Further, each of adjustment amounts stored in the parameter adjustment amounts C[bn] is altered to an adjustment amount on the basis of the respective parameter after change as follows.

$$\Delta D1i'=\Delta D1i-\eta\Delta D1av \quad (22)$$

$$\Delta D2i'=\Delta D2i-\eta\Delta D2av \quad (23)$$

$$\Delta ki'=\Delta ki/\eta\Delta kav \quad (24)$$

$$\Delta\beta ji'=\Delta\beta ji-\eta\Delta\uparrow av, (\text{if } Tmod=typ)$$

$$\Delta\beta ji'=0 \text{ (if } Tmod\neq typ) \quad (25)$$

$$Ti'=Ti \quad (26)$$

The parameter set after change herein is sent from the parameter changing means 60 to the parameter memorizing means 30, and thereafter, image processing conditions are determined by the parameter set after change (S10 and S11 in FIG. 5).

Then, finally, the parameter changing means 60 corrects relating to the number of times of call-out num1 of the concerned image processing condition from the last time parameter adjustment, stored in the parameter adjustment amount memorizing means 50, num1=0 (FIG. 5 S12).

(8) Parameter Correction Admission Judgment:

In a parameter correction admission judgment means 70, in the same manner as the parameter changing means 60, according to expressions (17) to (20), parameter values D1', D2', k' after change of the image processing condition, are calculated.

(8-1) Parameter Change No-Admission:

Then, the parameter value after change of these image processing conditions and the parameter before image processing condition adjustments are compared, and for all of parameters to be adjusted, each of threshold values ThdCrrctD, ThdCrrctK, ThdCrrctB is determined, and when the following condition is satisfied, the parameter correction admission judgment flag dolearning is changed to 1 (FIG. 5 S15, 16). That is, the change is not admitted.

|D1'−D1|<ThdCrrectD

|D2'−D2|<ThdCrrectD

|K'−K|<ThdCrrectK

|$\beta j'$−$\beta j$|<ThdCrrectB.

By conducting in this manner, when the parameter calculated from the result of parameter adjustment by the user has only a constant difference to the original parameter, the parameter change operation can be automatically converged. When it is converged once, in the photographing after that time, the image processing can be conducted by using the optimum parameter by the user.

(8-2) Parameter Change Admission:

On the one hand, parameter values after change of these image processing conditions and the parameter values before image processing condition adjustment are compared, and each of threshold values ThdUnCrrctD, ThdUnCrrctK, ThdUnCrrectB is determined, and when any one of them satisfies the following conditions, the parameter correction admission judgment flag dolearning is changed to 0 (FIG. 5 S15, S17). That is, the change admission=change re-start.

|D1'−D1|>ThdUnCrrectD,

|D2'−D2|>ThdUnCrrectD,

|k'−k|>ThdUnCrrectk,

|$\beta j'$−$\beta j$|>ThdUnCrrectB.

By conducting in this manner, even when the parameter change operation is converged once, when the parameter adjustment amount by the user becomes large, by automatically judging so that the parameter change is conducted again, it can be changed to the parameter optimum for the user.

(8-3) Each Kind of Condition at the Time of the Parameter Correction Admission Judgment:

In the parameter correction admission judgment, for each of the above threshold values ThdCrrctD, ThdCrrctK, ThdCrrctB, ThdUnCrrctD, ThdUnCrrctK, ThdUncrrctB, it is desirable that they satisfy the following conditions.

ThdCrrctD<ThdUnCrrctD,

ThdCrrctK<ThdUnCrrctK,

ThdCrrctB<ThdUnCrrctB.

When the threshold value for the no-admission and the threshold value for the admission (change re-start) are made the above conditions, the instability when the stop and re-start of the parameter change are repeated frequently, can be dissolved, and the stability can be increased.

Hereupon, as a result when the inventor as the applicant of the present invention conduct specific experiments for the present embodiment, the preferable results can be obtained in the range of the following values.

ThdCrrctD=0.03–0.1,

ThdCrrctK=0.1–0.3,

ThdCrrctB=0.05–0.1,

ThdUnCrrctD=0.1–0.2,

ThdUnCrrctK=0.3–0.6,

ThdUnCrrctB=0.1–0.2.

Further, this value is a specific example in which a desirable result is obtained in the conditions under which the inventor conducts experiments, and the invention is not limited to this value.

(9) Parameter Adjustment Amount Memorization Admission Judgment:

In a Parameter adjustment amount memorization admission judgment means 90, it judges whether the parameter expression received from the control means 80 is transmitted to the parameter adjustment amount memorizing means 50, from a value of the memorization admission judgment flag permitf (FIG. 5 S4). As a specific example of the embodiment by which this memorization admission judgment is conducted, there is a following embodiment.

(9-1) A Specific Example of the Parameter Adjustment Amount Memorization Admission Judgment:

When only a result of the image adjustment by a specific user is desired to reflect on the parameter correction, in the parameter adjustment amount memorization admission judgment means 90, the memorization admission judgment flag permitf corresponding to the user ID number is held. Further, a value of the memorization admission judgment flag permitf can be obtained from the well-known means as follows.

Initially, the user who can use the image processing apparatus according to the present embodiment, is limited to the previously registered user, and a unique ID number is set for each user. At the time of the user registration, the user is made to select the information whether he corrects the parameter, through the user interface.

For example, a check box of "the correction of parameter is admitted" is prepared on the user interface, and when the check is conducted, the value of '1' in the meaning that the parameter is corrected, and when not conducted, the value of '0' in the meaning that the correction of the parameter is not admitted, is stored, being related to the user ID number.

Then, when the use of the image processing apparatus is started, by inputting the user ID number as in the "log-in" operation from the user interface into the image processing apparatus, the operation by which the admission of the start of use is given is made to conduct by the user. The ID number inputted by the operation with all of user ID numbers stored in the user information recording means are collated, and when the coincident user ID number exists, the value of the memorization admission judgment flag corresponding to the user ID number is read in from the user information recording means.

Then, following the concerned operation, the value of the memorization admission judgment flag is transmitted to the parameter adjustment amount memorization admission judgment means 90 through the control means 80. Then, in the parameter adjustment amount memorization admission judgment means 90, the value of the memorization admission judgment flag is stored in a flag hold memory 91 (not shown).

When the parameter expression is received from the control means 80, in the parameter adjustment amount memorization admission judgment means 90, the parameter expression is held in a temporary storage memory 92 (not shown). After that, the memorization admission judgment flag permitf is read from the flag hold memory 91, and the value is referred.

Herein, when the value of the permitf is '1', the parameter adjustment amount memorization admission judgment means 90 transmits the parameter expression received from the control means 80 to the parameter adjustment amount memorizing means 50.

On the one hand, when the value of the permitf is '0', the parameter adjustment amount memorization admission judgment means 90 erases the parameter expression held in the temporary storage memory 92 received from the control means 80.

When such a structure is applied, like as a skilled radiation engineer, the parameter can be made to be corrected, by making only the user who gives the more effective information an object, and by a few learning number of times, it can reach the parameter to obtain the image adequate for the diagnosis.

(9-2) A Specific Example of the Parameter Adjustment Amount Memorization Admission Judgment:

In the parameter adjustment amount memorization admission judgment means 90, after the use-start operation of the user, until the value of the memorization admission judgment flag is stored in the flag hold memory 91, the same structure as the above specific example is applied.

On the one hand, in the parameter adjustment amount memorization admission judgment means 90, when the parameter expression is received from the control means 80, the memorization admission judgment flag permitf read from the flag hold memory 91 is added to the concerned parameter expression, and is transmitted to the parameter adjustment amount memorizing means 50.

In this case, in the parameter adjustment amount memorizing means 50, a value of a memorization admission judgment flag is also stored every at that time, in addition to the concerned parameter expression. Further, in the parameter adjustment amount memorizing means 50, relating to the number of times num1 in which the image processing corresponding to the subject number bn is conducted from the time when the parameter changing means 60 is conducted last time, and the number of times num2 in which the image processing corresponding to the subject number bn is conducted, from the time when the parameter changing means 70 is conducted last time, only when a value of the memorization admission judgment flag permitf respectively added by the parameter adjustment amount memorization admission judgment means 90, is '1', the respective one is renewed, and when not so, the value just before that time, is maintained.

In the parameter changing means 60, parameter correction admission judgment means 70, only when the value of the memorization admission judgment flag permitf stored together with the parameter expression is '1', the parameter is used for the calculation, and when the value of permitf is '0', the value of the parameter is neglected.

When such a structure is applied, by separately obtaining the parameter expression stored in the parameter adjustment amount memorizing means 50, for example, as the format of a file, the tracking research can be conducted regardless of whether the correction of the parameter is conducted or not, and the effective information for the maintenance of the apparatus can be obtained.

(9-3) A Concrete Example of the Parameter Adjustment Amount Memorization Admission Judgment:

In a system in which the image processing apparatus described above, is connected to a plurality of networks, when the parameter of the image processing is commonly owned and used, only in a specific image processing apparatus, the parameter correction is conducted. When the correction of the parameter is conducted, the corrected parameter is transmitted to the commonly-owned image processing parameter hold means (corresponds to the parameter memorizing means 30 of the above embodiments), and the renewal of the parameter is conducted.

Further, as the system which commonly owns the parameter, there is a system written in Tokkai 2002-279395. The procedure of correction of the parameter is as follows.

(9-3i) In the image processing apparatus by which the learning of the parameter is conducted, as described above, the parameter adjustment amount is stored, and the correction parameter is calculated according to a predetermined procedure.

(9-3ii) When the correction parameter is found, the parameter correction request is sent to the image processing parameter hold means.

(9-3iii) In the image processing parameter hold means which received the parameter correction request, the image processing parameter before correction is copied in the temporary memorizing means.

(9-3iv) When the copy into the temporary memorizing means is completed and the access from the other image processing apparatus connected to the network is stopped, the parameter correction admission is given to the image processing apparatus which sends the parameter correction request.

(9-3v) The image processing apparatus which received the parameter correction admission transmits the parameter after the correction to the image processing parameter hold means.

(9-3vi) In the image processing parameter hold means, the holding image processing parameter is replaced with the parameter after the correction.

(9-3vii) When the replace is normally completed, the image processing parameter held in the temporary memorizing means is erased, and the renewal of the parameter is completed. In this case, whether the replacement is normally completed can be judged by whether the data size of the image processing parameter after correction which is received by the image processing parameter hold means is a predetermined value or not. Further, in the case where the replacement of the parameter is judged to be wrong, when the image processing parameter before the correction stored in the temporary memorizing means is copied into the original memory, the image processing parameter is returned to the beginning.

(9-viii) When the renewal of the image processing parameter is normally completed, the parameter renewal notice is transmitted to the image processing apparatus connected on the network.

(9-ix) Each image processing apparatus obtains the renewed image processing parameter from the image processing parameter hold means.

Further, the correction request to the image processing parameter hold means can also be limited to a predetermined timing. For example, it can also be conducted in the procedure at the time of the start or end of the image processing apparatus, or at the time specified by the user.

In this case, when the learning of the image processing parameter is conducted, the parameter correction request is temporarily stored in a parameter correction request hold means, and at the predetermined timing, the parameter correction request hold means is referred and when the parameter correction request exists, it can be realized when the parameter correction request is transmitted to the image processing parameter hold means.

In the case where such a mode is applied, when a specific image processing apparatus is used by a skilled radiation engineer, as a result of the use by the concerned engineer, the corrected parameter can be reflected on the other apparatus, and relating to the image processing parameters of the whole system, by a few learning number of times, it can reach the parameter to obtain the image optimum for the diagnosis.

(A Processing Example of the Embodiment of the Present Invention, and Effects thereby)

Because the parameter is gradually changed by the adjustment amount and the adjustment value, adjusted by the user, the stored parameter approaches the situation of the image processing desired by the user, and the optimum image processing condition can be determined without for the user manually conducting the prior adjustment of the image processing condition, and it can be automatically optimized.

Further, in the case where the image processing condition to the radiation image is automatically changed by using the adjustment result by the user, when it is converged so that the difference between before and after the adjustment is not larger than a predetermined amount, by stopping the change, it can be optimized automatically and under the stable condition. Further, the image processing condition to the radiation image is automatically changed by using the adjustment result by the user, and in the case where the adjustment is converged in the predetermined condition, when the change is stopped, it can be automatically and under the stable condition optimized. Then, in the case where the image processing condition to the radiation image is automatically changed by using the adjustment result by the user, when the adjustment is converged, the change is temporarily stopped, however, when the difference between before and after the adjustment is larger than a predetermined amount, because dissociation is generated between the set situation and the situation desired by the user, when the change is automatically re-started, it can be optimized automatically and maintaining the stable situation. Further, when the threshold value of the stop and the threshold value of the re-start are set, there is no possibility that the stop and the re-start are carelessly repeated, and it can be optimized automatically and maintaining the stable situation.

Further, for the parameter adjustment amount described above, it is judged whether the parameter adjustment amount is stored. That is, when a means for limiting the data used for the learning of the parameter is provided, because the data to be not used for the learning originally can be excluded from the learning, the learning of the parameter can be effectively conducted. As this result, when optimizing is automatically conducted, by specifying the object which reflects the image adjustment result, even when a plurality of apparatus, or a plurality of users use it, the adjustment of the image processing condition is simply and stably conducted.

The Other Embodiment 1

In the description of the above embodiments, each kind of processing is conducted by using the parameter adjustment amount, however, also when, instead of the parameter adjustment amount, the parameter after the adjustment (correction parameter) is stored and the same processing as the above processing is conducted, the same effect can be obtained.

The Other Embodiment 2

In the present invention, the apparatus by which the parameter of the image processing is automatically optimized, is described, however, when occasion demands, a case where it is wished to return the parameter of the image processing to the initial value, is also considered. Therefore, it is preferable that a means for returning the image processing parameter to the initial value is provided.

As such a means, it can be realized by the well known means. For example, the initial value of the image processing parameter is previously stored in the parameter memorizing means 30, and a parameter initializing indicating means is provided in the user interface, and when the initializing indication is conducted by the means, by replacing the image processing parameter with the initial value of the image processing parameter stored in the parameter memorizing means 30, it can be realized.

The Other Embodiment 3

In the above embodiments, even when it is the structure in which the parameter adjustment amount memorization admission judgment means 90 and the parameter correction admission judgment means 70 are not provided, the parameter is gradually changed by the adjustment amount adjusted by the user. Therefore, the stored parameter approaches the situation of the image processing wished by the user, and the effect by which the optimum image processing condition can be determined is obtained without for the user manually conducting the prior adjustment of the image processing condition, and the first problem described above can be solved.

Further, when the parameter correction admission judgment means 70 is provided, because the automatic change of parameter value can be stopped and re-started, the stable operation can be desired, and the second problem can be solved.

Further, when the parameter correction admission judgment means 70 and the parameter adjustment amount memorization admission judgment means 90 are provided, the automatic change of the parameter value can be stopped and re-started, and when it is admitted, because the learning function is operated, when the specific image processing apparatus is used by the skilled radiation engineer, as a result of the use by the engineer, the corrected parameter can be reflected on the other apparatus, and for the image processing parameters of the whole system, it can reach the parameter for obtaining the image optimum for the diagnosis, by a few number of times of the learning, and the third problem can be solved.

What is claimed is:

1. An image processing method of producing an image proper for diagnosis from image data of a radiation image corresponding to an irradiation dose of radiation having passed through a radiographed object with an image processing apparatus, comprising:

an image processing step of conducting an image processing on the image data of the radiation image to produce a visual image of the radiation image based on an image processing condition including at least one or more parameters having a preliminarily-set default value;

an image processing condition adjusting step of adjusting plural times the parameters of the image processing condition to change at least one of an image density, a contrast and a degree of an edge enhancement in the visual image;

an adjustment result recording step of recording the adjustment result of the parameters in the plural adjustments in the image processing condition adjusted in the image processing condition adjusting step; and a parameter changing step of renewing the default value of at least one of the parameters in the image processing condition based on the adjustment results of the plural adjustments recorded in the adjustment result recording step, wherein the parameter changing step changes the parameter with regard to the parameter having a continuous value so that the average value of the parameter adjustment amounts of the plural times stored in the parameter memorizing step is decreased.

2. The image processing method of claim 1, wherein the adjustment result recorded in the adjustment result recording step includes at least one of an adjustment amount of the parameters and an adjusted value of the parameters included in the adjusted image processing condition.

3. The image processing method of claim 2, wherein the image processing condition adjusting step includes a parameter adjustment amount memorizing step of memorizing the adjustment amount of the parameter included in the adjusted image processing condition.

4. The image processing method of claim 3, further comprising:

an image processing condition setting step having a plurality of image processing conditions and supplying an adequate image processing condition to the image processing step, wherein the parameter adjustment amount memorizing step stores the parameter adjustment amounts of plural times of image processing for each image processing condition with regard to the parameter adjustment amount adjusted in the processing condition adjusting step and the parameter changing step changes the parameter by excluding the parameter adjustment amount having a large absolute value of the parameter adjustment amount from the stored adjustment amount of the parameters.

5. The image processing method of claim 3, wherein the image processing condition adjusting step includes an adjusted parameter memorizing step to store the value of a parameter after the parameter adjustment included in the image processing condition adjusted in the image processing condition adjusting step.

6. The image processing method of claim 5, wherein the parameter changing step determines the adjustment of the parameter having a discrete value by the mode of the parameter values after adjustments of the plural times stored in the parameter memorizing step.

7. The image processing method of claim 5, wherein the parameter changing step, with regard to a parameter having a continuous value, changes the parameter so that the difference between the average value of the parameter values after adjustments of the plural times stored in the parameter memorizing step and the value of the target parameter, is decreased.

8. The image processing method of claim 5, wherein the parameter changing step, with regard to a parameter having a continuous value, changes the parameter so that the average value of the parameter values after adjustments of plural times stored in the parameter memorizing step is decreased.

9. The image processing method of claim 3, further comprising a parameter change permission judging step to stop changing the parameter in the parameter changing step when a predetermined condition is satisfied.

10. The image processing method of claim 9, wherein the parameter change permission judging step obtains a difference between a parameter value after changing the parameter by calculating from the adjustment result stored in the adjustment result recording step and a target parameter value at this stage, and when the absolute value of the difference is not larger than a predetermined threshold value Thd1, the parameter change permission judging means stops changing the parameter.

11. The image processing method of claim 10, wherein the parameter change permission judging step obtains a difference between a parameter value after changing the parameter by calculating from the adjustment result stored in the adjustment result recording step and a target parameter value at this stage, and when the absolute value of the difference is not smaller than the predetermined threshold value Thd2, the parameter change permission judging step resumes changing the parameter.

12. The image processing method of claim 11, wherein in the parameter change permission judging step, the threshold value Thd1 to stop changing the parameter and the threshold value Thd2 to resume changing the parameter satisfy the following formula:

$$Thd2 > Thd1.$$

13. The image processing method of claim 10, wherein the parameter change permission judging step obtains a ratio Rp of a parameter value after changing the parameter by calculating from the adjustment result stored in the adjustment result recording step and a target parameter value at this stage, and when the absolute value of the ratio Rp satisfies the condition of (1−Thd3<Rp<1+Thd3) with regard to the predetermined threshold value Thd3, the parameter change permission judging step stops changing the parameter.

14. The image processing method of claim 13, wherein the parameter change permission judging step obtains a ratio Rp of a parameter value after changing the parameter by calculating from the adjustment result stored in the adjustment result recording step and a target parameter value at this stage, when the absolute value of the ratio Rp satisfies the condition of (1−Thd4>Rp or 1+Thd4<Rp) with regard to the predetermined threshold value Thd4, the parameter change permission judging step resumes changing the parameter.

15. The image processing method of claim 14, wherein in the parameter change permission judging step, the predetermined threshold value Thd3 to stop changing the parameter the predetermined threshold value Thd4 to resume changing the parameter satisfy the following formula:

Thd4>Thd3.

16. The image processing method of claim 14, wherein further comprising an adjustment result memorization permission judging step to judge whether or not the adjustment result is memorized in the adjustment result memorizing step.

17. The image processing method of claim 14, further comprising:
a control step of conducting the adjustment result recording step and the parameter changing step automatically.

18. The image processing method of claim 14, further comprising:
a control section to control the adjustment result recording section and the parameter changing step to renew the default value automatically.

19. An image processing program to make a computer to conduct the image processing method of claim 1 so as to obtain an image proper for diagnosis from a radiation image having image data corresponding to an irradiation dose of radiation having passed through a radiographed object.

20. The image processing method of claim 1, further comprising:
an image processing condition setting step having a plurality of image processing conditions and supplying an adequate image processing condition to the image processing step,
wherein the adjustment result recording step stores the adjustment result for each of the plurality of image processing conditions and the parameter changing step changes the default value of at least one of the parameters for each image processing condition according to the adjustment results stored in the adjustment result recording step for each image processing condition.

21. An image processing apparatus for producing a image proper for diagnosis from image data of a radiation image corresponding to an irradiation dose of radiation having passed through a radiographed object, comprising:
an image processing section for conducting an image processing on the image data of the radiation image to produce a visual image of the radiation image based on an image processing condition including at least one or more parameters having a preliminarily-set default value;
an image processing condition adjusting section for adjusting plural times the parameters of the image processing condition to change at least one of an image density, a contrast and a degree of an edge enhancement in the visual image;
an adjustment result recording section for recording the adjustment result of the parameters in the plural adjustments in the image processing condition adjusted by the image processing condition adjusting section; and
a parameter changing section for renewing the default value of at least one of the parameters in the image processing condition based on the adjustment results of the plural adjustments recorded by the adjustment result recording section,
wherein the parameter changing section changes the parameter with regard to the parameter having a continuous value so that the average value of the parameter adjustment amounts of the plural times stored in the parameter memorizing section is decreased.

22. The image processing apparatus of claim 21, wherein the adjustment result recorded in the adjustment result recording section includes at least one of an adjustment amount of the parameters and an adjusted value of the parameters included in the adjusted image processing condition.

23. The image processing apparatus of claim 22, wherein the image processing condition adjusting section includes a parameter adjustment amount memorizing section of memorizing the adjustment amount of the parameter included in the adjusted image processing condition.

24. The image processing apparatus of claim 22, further comprising:
an image processing condition setting section having a plurality of image processing conditions and supplying an adequate image processing condition to the image processing section,
wherein the parameter adjustment amount memorizing section stores the parameter adjustment amounts of plural times of image processing for each image processing condition with regard to the parameter adjustment amount adjusted in the processing condition adjusting section and the parameter changing section changes the parameter by excluding the parameter adjustment amount of a predetermined number of times having a large absolute value of the parameter adjustment amount from the stored adjustment amount of the parameters.

25. The image processing apparatus of claim 23, wherein the image processing condition adjusting section includes an adjusted parameter memorizing section to store the value of a parameter after the parameter adjustment included in the image processing condition adjusted in the image processing condition adjusting section.

26. The image processing apparatus of claim 25, wherein the parameter changing section determines the adjustment of the parameter having a discrete value by the mode of the parameter values after adjustments of the plural times stored in the parameter memorizing section.

27. The image processing apparatus of claim 25, wherein the parameter changing section, with regard to a parameter having a continuous value, changes the parameter so that the difference between the average value of the parameter values after adjustments of the plural times stored in the parameter memorizing section and the value of the target parameter, is decreased.

28. The image processing apparatus of claim 25, wherein the parameter changing section, with regard to a parameter having a continuous value, changes the parameter so that the average value of the parameter values after adjustments of plural times stored in the parameter memorizing section is decreased.

29. The image processing apparatus of claim 23, further comprising a parameter change permission judging section to stop changing the parameter in the parameter changing section when a predetermined condition is satisfied.

30. The image processing apparatus of claim 29, wherein the parameter change permission judging section obtains a difference between a parameter value after changing the parameter by calculating from the adjustment result stored in the adjustment result recording section and a target parameter value at this stage, and when the absolute value of the difference is not larger than a predetermined threshold value Thd1, the parameter change permission judging means stops changing the parameter.

31. The image processing apparatus of claim 30, wherein the parameter change permission judging section obtains a difference between a parameter value after changing the parameter by calculating from the adjustment result stored in the adjustment result recording section and a target parameter value at this stage, and when the absolute value of the difference is not smaller than the predetermined threshold value Thd2, the parameter change permission judging section resumes changing the parameter.

32. The image processing apparatus of claim 31, wherein in the parameter change permission judging section, the threshold value Thd1 to stop changing the parameter and the threshold value Thd2 to resume changing the parameter satisfy the following formula:

Thd2>Thd1.

33. The image processing apparatus of claim 30, wherein the parameter change permission judging section obtains a ratio Rp of a parameter value after changing the parameter by calculating from the adjustment result stored in the adjustment result recording section and a target parameter value at this stage, and when the absolute value of the ratio Rp satisfies the condition of (1−Thd3<Rp<1+Thd3) with regard to the predetermined threshold value Thd3, the parameter change permission judging section stops changing the parameter.

34. The image processing apparatus of claim 33, wherein the parameter change permission judging section obtains a ratio Rp of a parameter value after changing the parameter by calculating from the adjustment result stored in the adjustment result recording section and a target parameter value at this stage, when the absolute value of the ratio Rp satisfies the condition of (1−Thd4>Rp or 1+Thd4<Rp) with regard to the predetermined threshold value Thd4, the parameter change permission judging section resumes changing the parameter.

35. The image processing apparatus of claim 34, wherein in the parameter change permission judging section, the predetermined threshold value Thd3 to stop changing the parameter the predetermined threshold value Thd4 to resume changing the parameter satisfy the following formula:

Thd4>Thd3.

36. The image processing apparatus of claim 34, wherein further comprising an adjustment result memorization permission judging section to judge whether or not the adjustment result is memorized in the adjustment result memorizing section.

37. The image processing apparatus of claim 21, further comprising:
an image processing condition setting section having a plurality of image processing conditions and supplying an adequate image processing condition to the image processing section,
wherein the adjustment result recording section stores the adjustment result for each of the plurality of image processing conditions and the parameter changing section changes the default value of at least one of the parameters for each image processing condition according to the adjustment results stored in the adjustment result recording section for each image processing condition.

* * * * *